United States Patent
Sharp et al.

(10) Patent No.: US 9,626,520 B2
(45) Date of Patent: Apr. 18, 2017

(54) POLICY BASED TECHNIQUES FOR MANAGING ACCESS CONTROL

(71) Applicant: Apple Inc., Cupertino, CA (US)

(72) Inventors: Christopher B. Sharp, Cupertino, CA (US); Yousuf H. Vaid, Fremont, CA (US); Li Li, Los Altos, CA (US); Jerrold Von Hauck, Windermere, FL (US); Arun G. Mathias, Sunnyvale, CA (US); Xiangying Yang, Cupertino, CA (US); Kevin P. McLaughlin, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/815,391

(22) Filed: Jul. 31, 2015

(65) Prior Publication Data

US 2016/0063260 A1    Mar. 3, 2016

Related U.S. Application Data

(63) Continuation of application No. 14/085,951, filed on Nov. 21, 2013, now Pat. No. 9,098,714.
(Continued)

(51) Int. Cl.
*H04L 29/06* (2006.01)
*G06F 21/60* (2013.01)
*H04W 12/08* (2009.01)

(52) U.S. Cl.
CPC .......... *G06F 21/604* (2013.01); *H04L 63/102* (2013.01); *H04L 63/105* (2013.01); *H04L 63/20* (2013.01); *H04W 12/08* (2013.01)

(58) Field of Classification Search
CPC ... G06F 21/604; H04L 63/102; H04L 63/105; H04L 63/20; H04W 12/08
(Continued)

(56) References Cited

U.S. PATENT DOCUMENTS

| 2012/0108204 A1* | 5/2012 | Schell | H04W 8/205 455/411 |
| 2012/0108207 A1* | 5/2012 | Schell | H04L 63/0853 455/411 |

(Continued)

FOREIGN PATENT DOCUMENTS

| WO | 2012058099 A1 | 5/2012 |
| WO | 2012154600 A1 | 11/2012 |

OTHER PUBLICATIONS

PCT Application No. PCT/US2013/071099—International Search Report & Written Opinion dated Feb. 5, 2014.
(Continued)

*Primary Examiner* — Michael S McNally
(74) *Attorney, Agent, or Firm* — Downey Brand LLP

(57) ABSTRACT

A policy-based framework is described. This policy-based framework may be used to specify the privileges for logical entities to perform operations associated with an access-control element (such as an electronic Subscriber Identity Module) located within a secure element in an electronic device. Note that different logical entities may have different privileges for different operations associated with the same or different access-control elements. Moreover, the policy-based framework may specify types of credentials that are used by the logical entities during authentication, so that different types of credentials may be used for different operations and/or by different logical entities. Furthermore, the policy-based framework may specify the security protocols and security levels that are used by the logical entities during authentication, so that different security protocols and security levels may be used for different operations and/or by different logical entities.

20 Claims, 7 Drawing Sheets

Related U.S. Application Data

(60) Provisional application No. 61/729,208, filed on Nov. 21, 2012.

(58) Field of Classification Search
USPC .......................................................... 726/1
See application file for complete search history.

(56) References Cited

U.S. PATENT DOCUMENTS

| | | | |
|---|---|---|---|
| 2012/0117635 A1 | 5/2012 | Schell et al. | |
| 2012/0260086 A1* | 10/2012 | Haggerty | H04W 4/003 713/150 |
| 2012/0260090 A1* | 10/2012 | Hauck | H04L 63/0853 713/168 |
| 2012/0291125 A1 | 11/2012 | Maria | |
| 2012/0331292 A1 | 12/2012 | Haggerty et al. | |
| 2013/0122864 A1 | 5/2013 | Haggerty et al. | |
| 2013/0205390 A1* | 8/2013 | Hauck | H04L 63/1408 726/22 |
| 2014/0073375 A1* | 3/2014 | Li | H04W 4/001 455/558 |

OTHER PUBLICATIONS

Apple: "eUICC use cases and requirements on Policy Enforcement Function; SCPREQ (12))000051r3_eUICC_use_cases_and_requirements_on_policy_enforcement", ETSI Draft; Sep. 22, 2012, p. 1, XP014151198.

Australian Patent Application No. 2013347993—Patent Examination Report No. 1 dated Dec. 1, 2015.

Apple,"eUICC Use Cases and Requirements on Policy Enforcement," SCPREQ(12)000051r3, ETSI TC SCP REQ #39, Munich, Germany, Sep. 22, 2012.

Korean Intellectual Property Office Notice of Preliminary Rejection for KR Patent Application No. 10-2015-7012961 mailed May 18, 2016.

* cited by examiner

POLICY BASED TECHNIQUES FOR MANAGING ACCESS CONTROL

CROSS-REFERENCE TO RELATED APPLICATIONS

This application is a continuation of U.S. application Ser. No. 14/085,951, filed Nov. 21, 2013, entitled "POLICY-BASED TECHNIQUES FOR MANAGING ACCESS CONTROL", which claims the benefit of Provisional Application No. 61/729,208, entitled "POLICY BASED SYSTEM FOR MANAGING ELECTRONIC SIMS ON AN EMBEDDED UICC," filed Nov. 21, 2012, the contents of which are incorporated herein by reference in their entirety for all purposes.

FIELD

The disclosed embodiments relate to techniques for facilitating authentication and secure communication in wireless systems. More specifically, the disclosed embodiments relate to techniques for managing privileges for logical entities that perform operations associated with a secure access-control element in a secure element in an electronic device.

BACKGROUND

Many wireless communication systems use access-control techniques to ensure secure communication. For example, an access-control technique may involve: verifying the identity of a communicating party; and granting a level of access commensurate with the verified identity. In cellular-telephone systems (such as the Universal Mobile Telecommunications System or UMTS), access control is typically governed by an access-control element or client (such as a Universal Subscriber Identity Module or USIM) executing on a physical Universal Integrated Circuit Card (UICC). The access-control client usually authenticates a subscriber to the cellular network. After successful authentication, the subscriber may be allowed access to the cellular network. In the discussion that follows, note that an 'access-control client' refers generally to a logical entity (which may be implemented in hardware and/or software) that controls access from an electronic device to a network. In addition to a USIM, an access-control client may include: a CDMA Subscriber Identification Module (CSIM), an IP Multimedia Services Identity Module (ISIM), a Subscriber Identity Module (SIM), a Removable User Identity Module (RUIM), etc.

Traditionally, the access-control client performs an authentication-and-key-agreement (AKA) technique, which verifies and decrypts the applicable data and programs to ensure secure initialization. Specifically, the access-control client may: answer a remote challenge to prove its identity to the network operator, and may issue a challenge to verify the identity of the network.

While traditional access-control-client solutions are embodied within a removable Integrated Circuit Card (ICC) (which is sometimes referred to as a 'SIM card'), recent research is directed to virtualizing SIM operation within a software client executing on an electronic device. Virtualized SIM operation can reduce device size, increase device functionality, and provide greater flexibility. Note that a 'virtualized SIM' may refer to an electronic SIM (eSIM).

However, virtualized SIM operation also presents new challenges for network operators and device manufacturers. For example, traditional SIM cards are manufactured and guaranteed by a trusted SIM vendor. These traditional SIM cards execute a single, secure version of software that has been permanently 'burned' to the SIM card. Once burned, the SIM card usually cannot be changed or tampered with (without also destroying the SIM card).

In contrast, portable electronic devices are manufactured by a wide range of device manufacturers, and may execute software provided by multiple and possibly unknown third-party software vendors. Additionally, portable electronic devices are frequently 'patched' with software, which can both fix existing bugs, and introduce new ones. Hence, this software can be susceptible to corruption, sabotage, and/or misuse.

Moreover, while physical SIM cards are very difficult to replicate, software can be readily copied, multiplied, etc. Because each SIM represents a contracted-for amount of access to finite network resources, illicit use of a virtualized SIM can greatly impact network operation and user experience (e.g., such illicit use can rob the network of resources that would otherwise be available for the valid users, thereby degrading the speed, availability, etc. of services for such valid users).

As a consequence, new solutions are needed to provide protections and other properties for virtualized SIMS (and, more generally, access-control clients) that are generally analogous to those of traditional physical SIMS. Furthermore, improved solutions are needed for storing and distributing virtualized access-control clients. Ideally, these solutions can provide the benefits of traditional access-control client operation, with the added capabilities provided by virtualized operation.

SUMMARY

The described embodiments relate to an electronic device. This electronic device includes a secure element with an access-control element that identifies a user of a service and facilitates secure communication, where the access-control element is associated with a set of operations. Moreover, the secure element includes a processor, and memory that stores a program module which is executed by the processor and a credential-management module that specifies a profile with a set of privileges for logical entities associated with the set of operations. Furthermore, for some of the operations, there can be different privileges for some of the logical entities.

In some embodiments, the credential-management module includes information that is used by the program module to specify the set of privileges.

Note that the access-control element may include an electronic subscriber identification module (eSIM).

Moreover, the logical entities may be internal and/or external to the electronic device.

Furthermore, the access-control element may include information specifying a second set of privileges for at least one of the logical entity and the second logical entity. In the event of a conflict between a security level associated with the set of privileges and a second security level associated with the second set of privileges, the secure element may compare the security level and the second security level and may select the one of the set of privileges and the second set of privileges that is associated with stronger security. Alternatively, in the event of a conflict between a security level associated with the set of privileges and a second security level associated with the second set of privileges, the secure element may select the set of privileges.

Additionally, the set of operations may include: loading the access-control element, enabling the access-control element, disabling the access-control element, exporting the access-control element, and/or deleting the access-control element.

In some embodiments, the credential-management module includes symmetric cryptographic keys associated with the set of operations, and a given cryptographic key facilitates providing the privileges associated with the set of operations. Alternatively or additionally, the credential-management module may include asymmetric cryptographic keys associated with the set of operations and certificates to facilitate asymmetric cryptography, and the given cryptographic key and a given certificate may facilitate providing the privileges associated with the set of operations.

Another embodiment provides a method for specifying the set of privileges for the logical entities. During this method, credentials are received from a first logical entity and a second logical entity. Then, the set of privileges associated with the set of operations for the first logical entity and the second logical entity are determined based on the credentials and the credential-management module. Next, the information specifying the set of privileges of the first logical entity and the second logical entity are provided to the access-control element in the secure element in the electronic device, where the access-control element identifies the user of a service and facilitates secure communication. Moreover, the access-control element is associated with the set of operations and, for some of the operations, there are different privileges for the first logical entity and the second logical entity.

In some embodiments, a program module is executed using a processor in the electronic device.

DETAILED DESCRIPTION

Overview

Figure 1:
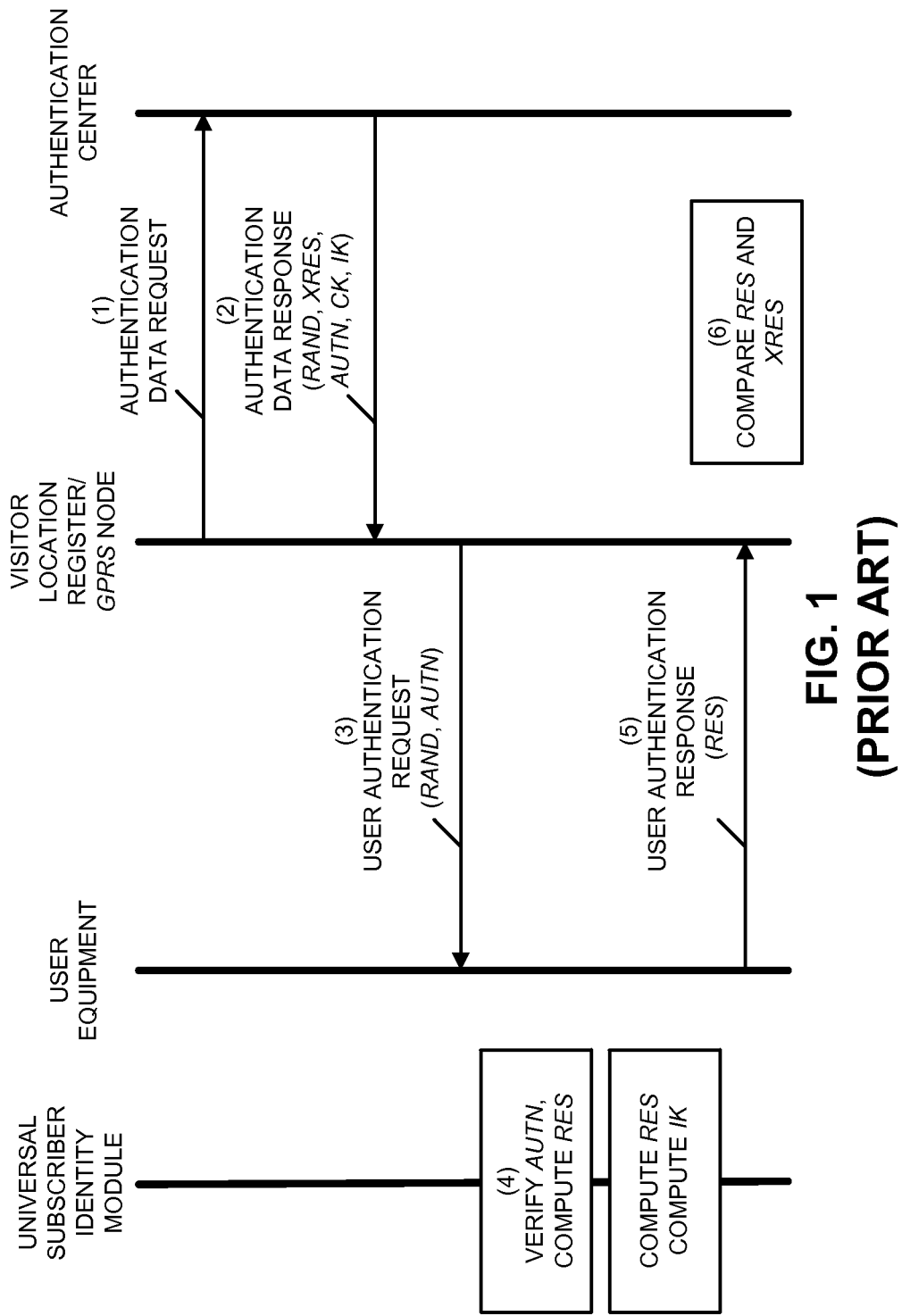
FIG. 1 is a drawing illustrating an existing authentication-and-key-agreement (AKA) technique.

The disclosed embodiments provide an apparatus and techniques for storing and distributing access-control elements to electronic devices, such as portable electronic devices (e.g., 'smartphones,' etc.). The electronic devices used for transferring the access-control elements (e.g., eSIMs) may enforce uniqueness and conservation of the access-control elements by ensuring that the transfer is only performed with a trusted destination electronic device. In one embodiment, a eUICC appliance that is implemented within a hardware security module (HSM) is disclosed. Each HSM can store a large number of eSIMs to facilitate their storage and distribution, e.g., for retail services. The eUICC appliance may verify that its peer eUICC appliances are operating according to an agreed-upon and trusted protocol. If both eUICC appliances are in agreement, then, when the source eUICC appliance transfers its eSIM, it will delete its eSIM or otherwise render its own eSIM inactive. The destination eUICC appliance may retain the only active version of the eSIM.

In another embodiment, when an access-control element is moved from one electronic device to another, the receiving or destination electronic device issues a challenge or unique identifier. The sending electronic device may encrypt the access-control element using the public key of the receiving electronic device and may add a unique identifier or challenge. Moreover, the combination of the encrypted access-control element and the unique identifier or challenge may also be signed. After transmission, the sending electronic device may delete its access-control element. Then, the receiving electronic device may verify the encrypted access-control element and the unique identifier. If these are valid, the receiving electronic device may store the encrypted access-control element and the unique identifier for future use.

In an exemplary configuration, access-control elements are only transferred between electronic devices that conform to a standard trusted relationship. Because both electronic devices are operating according to an agreed-upon protocol, an access-control element can remain unique and conserved throughout its transfer. Furthermore, by ensuring that the access-control element is encrypted only for the destination electronic device and is deleted from the current electronic device, intervening malicious parties cannot subvert or defeat the transfer process.

Various other embodiments for the transfer of access-control elements are also described in greater detail below.

In addition, a system and a technique for implementing a policy is described. This policy can be used to associate different access-control-element-related operations with different sets of credentials for logical entities and/or different security protocols that are used when performing the operations. In this way, different logical entities may have different privileges associated with different operations.

DETAILED DESCRIPTION OF EXEMPLARY EMBODIMENTS

Exemplary embodiments and aspects of the present disclosure are now described in detail. While these embodiments and aspects are primarily discussed in the context of Subscriber Identity Modules (SIMS) of a GSM, GPRS/EDGE, or UMTS cellular network, the communication technique in the present disclosure may be used in a wide variety of communication systems that can benefit from storing and distributing access-control elements (which may include electronic SIMS or eSIMs) to electronic devices, such as those based on: an Institute of Electrical and Electronics Engineers (IEEE) 802.11 standard, Bluetooth® (from the Bluetooth Special Interests Group of Kirkland, Wash.), and/or another type of wireless interface, such as a near-field-communication standard or specification (from the NFC Forum of Wakefield, Mass.). While the term 'Subscriber Identity Module' is used in the present discussion (e.g., eSIM), this term does not necessarily connote or require: use by a subscriber per se (e.g., the disclosure may be practiced by a subscriber or a non-subscriber); use by a single individual (e.g., the disclosure may be practiced on behalf of a group of individuals, such as a family, or intangible or fictitious entity, such as a company, organization or an enterprise); and/or any tangible 'module' equipment or hardware.

Existing Subscriber Identity Module (SIM) Operation

Within the context of the exemplary UMTS cellular network, user equipment (UE) may include a portable electronic device and a Universal Subscriber Identity Module (USIM). The USIM may be a logical software entity that is stored and executed from a physical Universal Integrated Circuit Card (UICC). Typically, a variety of information is stored on the USIM, such as subscriber information, as well as the keys and techniques used for authentication with the network operator in order to obtain wireless network services. In one embodiment, USIM software is based on the Java Card™ programming language. Java Card is a subset of the Java™ programming language that has been modified for embedded 'card' type devices (such as the UICC). Other implementations may include so-called 'native' software implementations and/or implementations that are proprietary, etc.

In general, UICCs are programmed with a USIM prior to subscriber distribution. This pre-programming or 'personalization' may be specific to each network operator. For example, before deployment, the USIM may be associated with an International Mobile Subscriber Identity (IMSI), a unique Integrated Circuit Card Identifier (ICC-ID) and a specific authentication key (K). The network operator may store the association in a registry contained within the network's Authentication Center (AuC). After personalization the UICC can be distributed to subscribers.

FIG. 1 presents an existing authentication-and-key-agreement (AKA) technique using a USIM. During normal authentication in the AKA technique, the UE may acquire the International Mobile Subscriber Identity (IMSI) from the USIM. Then, the UE may pass the IMSI to the serving network (SN) of the network operator or the visited core network. The SN may forward the authentication request to the AuC of the home network (HN). Moreover, the HN may compare the received IMSI with the AuC's registry and may obtain the appropriate K. Next, The HN may generate a random number (RAND) and may sign it with K using a technique to create the expected response (XRES). Furthermore, the HN may generate a cipher key (CK) and an integrity key (IK) for use in cipher and integrity protection, as well as an authentication token (AUTN) using various techniques. Additionally, the HN may send an authentication vector, which may include the RAND, XRES, CK, and AUTN to the SN. The SN may store the authentication vector only for use in a one-time authentication process, and the SN may pass the RAND and the AUTN to the UE.

After the UE receives the RAND and the AUTN, the USIM may verify whether the received AUTN is valid. If so, the UE may use the received RAND to compute its own response (RES) using the stored K and the same technique that generated the XRES. Moreover, the UE passes the RES back to the SN. Then, the SN may compare the XRES to the received RES and, if they match, the SN may authorize the UE to use the operator's wireless network services.

The aforementioned AKA technique may be embodied in the physical media of the SIM card. In general, SIM cards typically have at least two distinct and desirable properties: they provide cryptographically secure storage for SIM data (e.g., account information, encryption keys, etc.); and they cannot be easily cloned.

Furthermore, a SIM card may include a processor and memory formed in a Universal Integrated Circuit Card (UICC). This SIM card may be filled with epoxy resin to prevent external probing of data signals on the UICC. However, other tamper proof structures may be included in the UICC if desired (e.g., shielding layers, masking layers, etc.). Additionally, the SIM card may have a secure interface to the processor, and the processor may have an internal interface to the memory. Note that the UICC may receive power from the external device, which enables the processor to execute code from the memory component. The memory component itself may not be directly accessible (e.g., internal file systems may be hidden from the user), and may be accessed via the processor.

During normal operation, the processor may accept a limited number of commands. Each of these commands may only be conditionally accessible. Moreover, access conditions may be constrained to the execution of commands to prevent unauthorized access. Furthermore, access conditions may or may not be hierarchical, e.g., authorization for one level may not automatically grant authorization for another level. For example, a set of access conditions may include: always accessible, never accessible, accessible to a first account, accessible to a second account, etc. Conditional access may be granted only after successful completion of an appropriate security protocol. Note that techniques for verifying a user's identity may include: a password, a personal identification number (PIN), challenge of a shared secret, etc.

The conditional access, limited command set, and/or protected memory space may ensure that the information stored within the SIM card is secure from external access. Cloning a SIM card may entail construction of a physical card, and construction of the internal file system and data. The combination of these features may render the physical SIM card largely impervious to practical forgery attempts.

Electronic Subscriber Identity Module (eSIM) Operation

As a brief aside, the terms 'conservation,' 'conserve' and 'conserved,' as used herein, may refer to an element (either physical or virtual) that cannot be trivially multiplied or diminished. For example, a conserved eSIM cannot be copied or replicated during normal operation.

Additionally, as used herein, the terms 'unique' and 'uniqueness' (as applied to a physical or a virtual element) may refer to an element that is the one and only element having a particular property and/or characteristic. For example, a unique eSIM cannot have a duplicate eSIM.

As used herein, the term 'security' generally refers to protection of the data and/or software. For example, access-control data security may ensure that the data and/or software associated with an access-control element is protected from theft, misuse, corruption, publication and/or tampering by unauthorized activities and/or malicious third parties.

Moreover, as used herein, the term 'user authorization' generally refers to specifying a user's access to resources. Note that, in the case of existing physical SIM cards, user authorization may be enforced with physical SIM card possession. Thus, the physical SIM card may represent the user's authorization to access network resources. For example, when a physical SIM card is moved from one cellular telephone to another cellular telephone, it is assumed that the move was performed by the user (and implicitly authorized by the user). Within the context of eSIM operation, analogous capabilities may be needed for user authorization of eSIM transfers. In particular, the 'owner' of the eSIM (and also the network) may need assurances that the eSIM is only transferred to legitimate devices.

Generally, it is appreciated that software is more flexible than hardware. For example, software is usually easy to copy, modify, and distribute. Additionally, software can often be made cheaper, more power efficient, and physically smaller than hardware equivalents. Consequently, while conventional SIM operation makes use of physical form factors such as cards (UICCs), current areas of development are focused toward virtualizing SIM operation within software. However, the sensitive nature of SIM data (e.g., subscriber-specific information, etc.) usually requires special consideration. For example, various portions of SIM data are unique to subscribers, and should be carefully guarded from malicious third parties. Moreover, as noted previously, each SIM represents a contracted-for amount of access to finite network resources. Therefore, duplication, destruction, and/or reclamation of SIMS may be managed to prevent over- and/or underutilization of network resources, as well as subrogation of service provider fees or revenue. As a consequence, virtualized SIMS should ideally satisfy the following properties: security, uniqueness, and conservation. Moreover, these properties should ideally be afforded at a cost at least comparable to existing network infrastructures.

In some embodiments, SIM operation emulates a UICC as a virtual or electronic entity, such as a software application that is henceforth referred to as an 'Electronic Universal Integrated Circuit Card' (eUICC). The eUICC may be capable of storing and managing one or more SIM elements, which are henceforth referred to as 'Electronic Subscriber Identity Modules' (eSIMs). However, solutions for virtualized eSIM operation usually must provide equivalent (if not improved) security to existing security capabilities already provided by existing UICCs. In addition, the existing infrastructure typically requires suitable techniques for enforcing conservation of virtualized eSIMs, such that the number of virtualized eSIMs is controlled throughout the network (e.g., virtualized eSIMs are not duplicated, lost, etc.).

Figure 2:
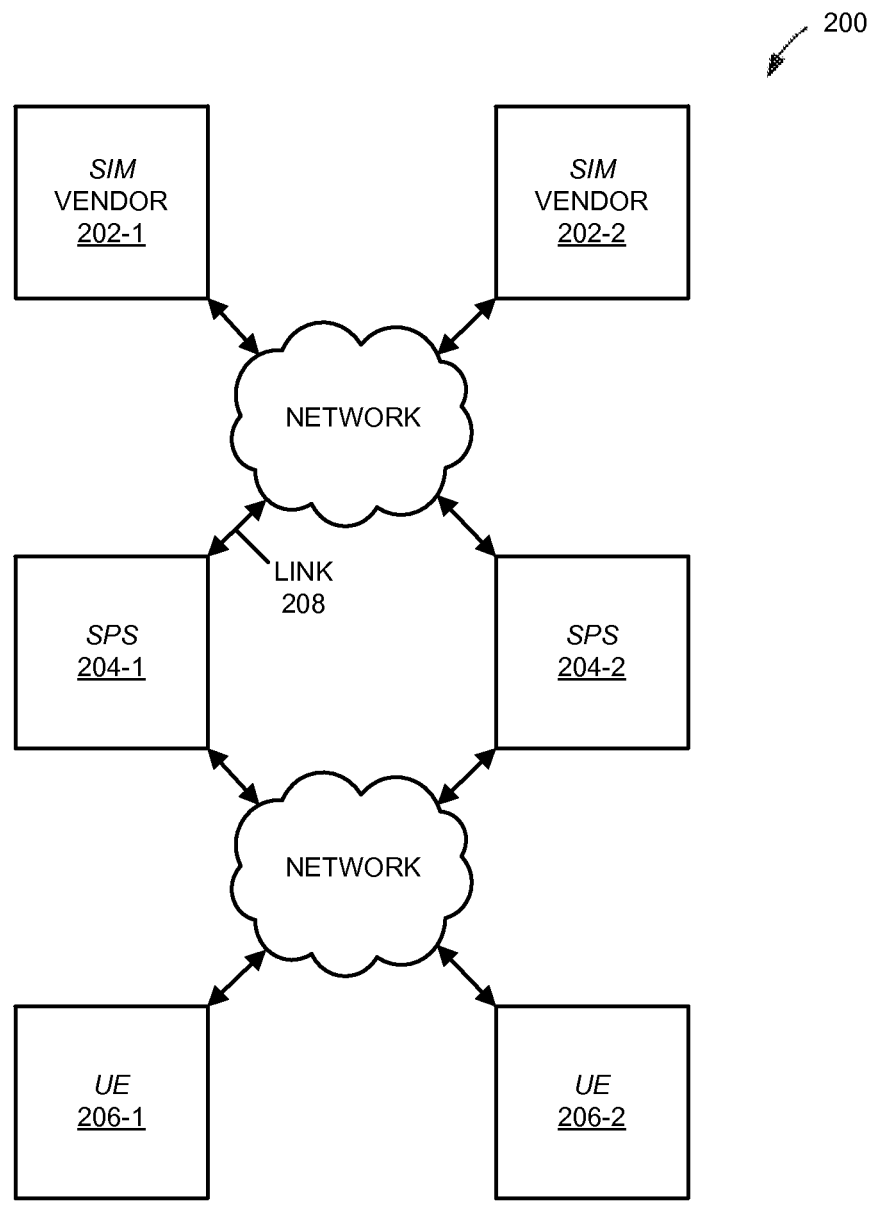
FIG. 2 is a block diagram illustrating a network architecture for distributing access-control elements in accordance with an embodiment of the present disclosure.

FIG. 2 presents a block diagram illustrating a system 200 that includes: a number of SIM vendors 202, a number of SIM provisioning servers (SPSs) 204 (such as those described in greater detail in co-owned and co-pending U.S. patent application Ser. No. 12/952,082, filed on Nov. 22, 2010, and entitled "Wireless Network Authentication Apparatus and Methods," and U.S. patent application Ser. No. 12/952,089, filed on Nov. 22, 2010, and entitled "Apparatus and Methods for Provisioning Subscriber Identity Data in a Wireless Network," the contents of both of which are herein incorporated by reference), and a population of user equipments (UEs) 206, where each UE contains a secure eUICC. The following discussion describes different embodiments for distributing eSIMs from a SIM vendor to the secure eUICC.

In one embodiment, one of UEs 206 requests an eSIM from any SPS 204, and the SPS retrieves an appropriate eSIM from a trusted entity such as SIM vendor 202 (or in other cases a mobile network operator (MNO), trusted services manager (TSM), etc.). In this approach, the SIM vendor can easily control the distribution of eSIMs. For example, each newly requested eSIM may only be granted by the SIM vendor. However, because the SIM vendor may be the only party that can dispense eSIMs, the SIM vendor can create 'bottlenecks' if a large population of subscribers flood the SIM vendor with requests within a short period of time (as is common for successful product releases). Similarly, the SIM vendor may be a single point of failure. Consequently, in the event of a disaster or other malfunction, eSIM issuance could be completely halted.

In another embodiment, each SPS 204 retrieves a pool of eSIMs from SIM vendor 202, and stores the pool of eSIMs within each SPS (the pool of eSIMs is duplicated for each SPS). Then, the SPS distributes the eSIMs to UEs 206 on request. Note that the eSIM may only be decrypted and used by the secure eUICC. This distributed SPS server model is not bottlenecked by the SIM vendor. However, this approach typically requires substantially more infrastructure. In particular, the population of SPSs may need to ensure that no duplicated eSIMs are distributed. Therefore, whenever an SPS grants an eSIM, the other SPSs may need to be notified to deactivate their duplicate eSIMs, such as via communication link 208. This may ensure that the eSIMs are unique (e.g., no duplicate eSIMs have been distributed). The communication to retain eSIM state information synchronization between the SPSs may be a significant amount of traffic on network infrastructure. Moreover, slow network connections or network disruption can further cause 'race conditions.' Within the context of computer networking, race conditions generally refer to data hazards resulting from propagation delay in network-entity synchronization. For example, imperfect synchronization can cause two SPSs to export the same eSIM at the same time (creating a race condition). This may result in the eSIM being accidentally cloned.

In another embodiment (not shown), SPS 204 and SIM vendor 202 infrastructures are combined in some fashion. For example, the SIM vendor and SPS network may be housed together in a common facility and freely access one another, or may be otherwise logistically intertwined. Successful operation of the intertwined facilities may require a trusted business relationship between the SIM vendor and the SPS network operator, which may be undesirable (e.g., where business concerns conflict, due to legal anti-trust considerations, etc.).

Each of the foregoing embodiments may involve significant communications overhead to synchronize the various network entities during transfer. For example, when an eSIM is successfully transferred from an SPS to a portable electronic device, each SPS may be notified that the eSIM cannot be transferred again (to prevent multiple deliveries of the same eSIM).

Note that these embodiments are disclosed as using a eUICC device at the user equipment to receive and utilize the eSIM data. However, in order to accommodate use of legacy devices within the system, the foregoing embodiments may be implemented in a system in which the eUICC functionality is placed on a traditional SIM form factor or card (as will be discussed in greater detail below).

Methods

Accordingly, various aspects of the present disclosure advantageously enable virtualized access-control-element operation and distribution, which provide equivalent and/or improved capabilities to existing solutions (e.g., physical card based access-control elements). In an exemplary embodiment, a self-contained SIM provisioning service (SPS) entity can operate in conjunction with other peer SPS devices, enabling distributed peer models for SIM provisioning (as opposed to a centralized model which tracks eSIMs from a centralized database, or distributed techniques which require synchronization between peer devices). Moreover, as described in greater detail herein, embodiments of the present disclosure advantageously are not specific to any particular network infrastructure, and can flexibly accommodate virtually any configuration.

In one aspect of the disclosure, an access-control element can be stored and transferred only to one secure element in an electronic device at a time. In some embodiments, the secure element only stores access-control elements received from other secure elements that have the same or comparable protocols (described in greater detail subsequently herein). Similarly, the secure element may limit the transfer of access-control elements to other secure elements that have the same or comparable protocols. For example, the secure elements may limit transactions to other secure elements that meet certain security requirements. Some MNOs may enforce higher security with their devices than other MNOs. In various embodiments, secure elements could be certified at different levels, and the access-control elements may require a certain certification level. During the transfer process, the device may remove (or render inactive) its own access-control element. By ensuring that both clients involved in the transfer are trusted entities and honor the same protocol, access-control elements may not be multiplied or diminished during transfer.

Note that a secure element may be embodied as a processor or processing apparatus executing software from a protected storage medium. In some embodiments, the protected storage medium may be encrypted so as to preclude unauthorized access or tampering. Moreover, the secure element may be physically hardened or protected to prevent access to the storage medium and/or the secure processor. Examples of physical hardening may include: a physical case or another mechanism primed to self-destruct or render the device inaccessible in the event of unauthorized access attempts, and/or embedding circuits in a resin or other material to prevent external probing.

In some embodiments, the secure element of the present disclosure further limits and/or monitors/flags aberrant access. For example, transfer or storage of an access-control element to the secure element may require a challenge response and/or unique identifier. An improper challenge response or an incorrect identifier may indicate aberrant/fraudulent activity. Similarly, transactions between secure elements may be encrypted. Consequently, improperly encrypted transactions may also flag suspicious behavior.

Figure 3:
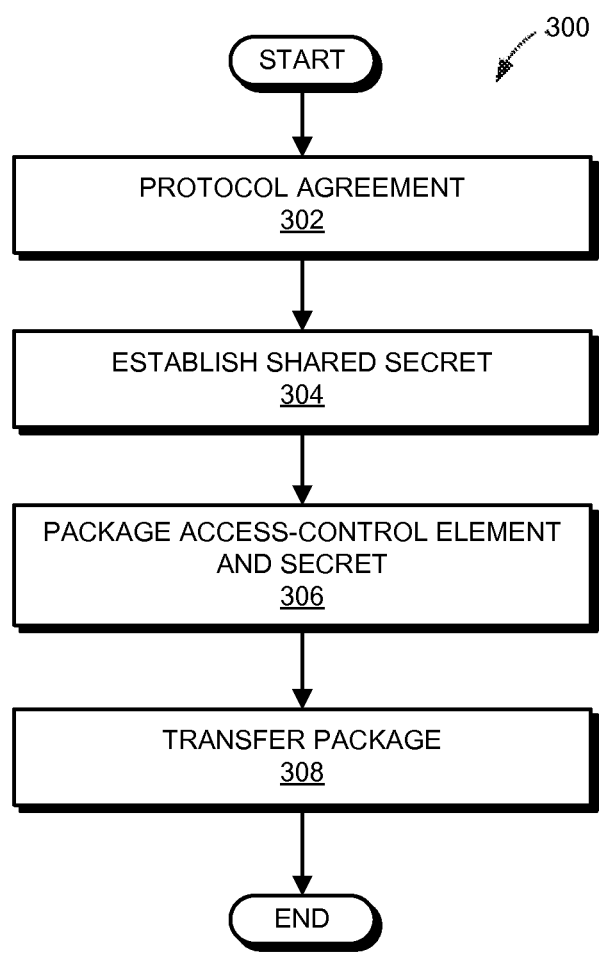
FIG. 3 is a flow diagram illustrating a method for transferring access-control elements to electronic devices in accordance with an embodiment of the present disclosure.

FIG. 3 presents a flow diagram of a method 300 for storing and transferring access-control elements. In some embodiments, method 300 involves at least one device that is a eUICC appliance that is embodied within an HSM that can manage the storage of one or more eSIMs. Alternatively or additionally, the HSM may store the encrypted eSIM locally or may encrypt the eSIM for storage on remote media (in some cases, in secure file systems).

In some embodiments, at least one device is a eUICC appliance that is embodied within a physical SIM card form factor (e.g., enabling legacy form-factor receptacle reuse, as described further below with reference to FIG. 7).

In some embodiments, at least one device is a hardened device, such as a cellular telephone, including a eUICC appliance embodied within a secure element (e.g., the secure element cannot be removed from the device without destroying or otherwise compromising the integrity of the device).

In method 300, the source device and destination device agree on a protocol (operation 302). In some embodiments, the protocol type is based on a version of software identified, e.g., in plain text. In other embodiments, the protocol type is inherent to an otherwise ciphered initial communication. For example, an encrypted 256-bit challenge may inherently specify a particular protocol or set of protocols, whereas an unencrypted challenge may inherently specify a different protocol. In still other embodiments, the protocol is based on a discovery process. For example, devices may be registered with a directory service, where a registry includes information such as: identifier, network address, supported protocol types, etc.

In an exemplary embodiment, the protocol type is determined by a signed (digital) certificate issued by a mutually trusted issuer authority. A digital certificate may include: a serial number (to uniquely identify the certificate), the device being certified, the signature technique used to create the signature, the issuer that verified the information and signed the certificate, a validity range (e.g., valid from, valid until, etc.), an encryption key, and/or a thumbprint or verification hash (to verify the legitimacy of the certificate). Digital certificates are well known in the related arts and will not be further described herein.

In some embodiments, the mutually trusted issuer authority is an activation authority, e.g., the MNO authentication center (AuC). In other embodiments, the mutually trusted issuer authority is a trusted third party, e.g., a SIM vendor, the device manufacturer, etc. The mutually trusted issuer authority may not need to be the same for both devices. For example, a system may have multiple trusted entities (e.g., multiple accepted MNOs, multiple trusted device manufacturers, etc.). Moreover, in certain systems, a trusted entity may be a root of trust for another unknown entity (e.g., the trusted entity provides assurance that the unknown entity can also be trusted). Such trust 'chains' may be extended across an arbitrary number of intermediate devices. Each intermediate device may be chained to the trust level of its predecessor, which extends to the trusted root entity.

In other examples, eUICC appliances may support any appliance device that is compliant to a standardized specification, etc. Similarly, to ensure backward compatibility, future incarnations of a eUICC appliance may also support legacy eUICC appliances, etc.

The available devices and/or accepted protocols for available devices may be stored, for example, within a lookup directory or similar service. For example, multiple arrays of appliances may be matched with a directory-service server that provides connection information for each of the appliances. A requester party (either source or destination) may request information from the directory service.

In some embodiments, the protocols are codified according to a software version or revision. For example, the devices may verify that the other device includes an acceptable software version or revision. Alternatively, the source and destination devices may agree to an informal or initial protocol. For example, the devices may negotiate or determine a protocol dynamically. In yet other embodiments, no protocol negotiation is necessary (e.g., systems that only support a single transfer protocol).

The transfer protocol may specify types of challenge-response protocols, unique identifier selection, transfer encryption, access-control-element management (e.g., deletion procedures, acknowledgment procedures, etc.) during transfer. As previously discussed, in order to ensure that conservation and uniqueness properties of an access-control element are retained during transfer, the access-control element may be encrypted particularly for the destination device, and may be deleted from the transferring device. For example, the transfer protocol may specify: if acknowledgment of reception is required, whether retransmission is allowed when transmission fails, an acceptable number of retry attempts, and/or under what conditions the source device can delete the encrypted access-control element.

It will be appreciated that the source device may delete and/or deactivate the encrypted access-control element at different times and/or under different conditions, as may be convenient or required under the various scenarios. In some embodiments, deletion may occur sometime after transfer. Such embodiments may be of use in bulk transfers so as to minimize unnecessary signaling (e.g., deleting each access-control element before transferring another). Alternatively, the access-control element may be deactivated sometime before transfer. In other embodiments, a 'validity window' may also be specified for transfer, such that a particular transfer must be accomplished within a prescribed temporal window in order to be considered valid.

Other considerations include device considerations and/or access-control-element considerations. For example, some devices may only be allowed to receive (or transmit) an access-control element. In an exemplary embodiment, a portable electronic device is limited to only receiving an eSIM (once assigned, it cannot be returned, etc.). Alternatively, certain devices may be used only as a 'one-time' transfer (e.g., a disposable device for providing an eSIM once). In some cases, a device may be more (or less) secure than the peer device. For example, user equipment may have more rigid security requirements than a eUICC appliance. In particular, the eUICC appliance may be protected via other measures (e.g., secure infrastructure, etc.). Secure user equipment can also transfer an eSIM to a less secure eUICC appliance, provided that the less secure eUICC appliance implements a minimum level of security commensurate with protection of the sensitive information contained therein. Similarly, in some cases, access-control elements may have transfer limitations, including: a total number of transfers allowed, destination device restrictions, etc.

Moreover, it is appreciated that the communication technique may have significant impact on transfer protocol considerations. Network infrastructure transfers may use high-bandwidth protocols and media (e.g., T3, T1, Sonet (synchronous optical networking), Gigabit Ethernet or 10 G, etc.), whereas consumer-based transfers may be performed over lower-bandwidth connections (e.g., cellular access, WLAN (wireless local area network), Ethernet, etc.). Different use scenarios may also have different requirements for handshaking, transfer time requirements, etc. For example, a SIM vendor may transfer a large number of eSIMs to a eUICC appliance (e.g., such as to facilitate SIM delivery or other functions). Similarly, in another example, a centralized large repository of eSIMs may be freely transferred among a number of eUICC appliances. The eUICC appliances may transfer eSIMs from appliance to appliance, to facilitate load management, etc. Handshaking requirements for these bulk transfer scenarios may be less important, because the eSIMs may not be in circulation (e.g., acknowledgments can be lumped together at the end of the transfer, rather than for each individual eSIM).

Customer applications may have much-slower transfer rates, but handshaking may be more important because the eSIM should be robustly delivered, and immediately available for use. In some embodiments, failure to complete the handshaking process automatically triggers a retry attempt. For example, a eUICC appliance, SPS, or similar entity may directly transfer an eSIM to service an impromptu eSIM request from the UE, or an application executing from a desktop or portable computer. In another example, customer-based applications may execute a small internalized appliance capable of storing one or more eSIMs (e.g., one for work, one for personal use, several for roaming access, etc.), enabling a customer to transfer an eSIM among their various devices.

Then, the source and destination devices establish a shared secret (operation 304). In an exemplary embodiment, the devices verify the peer device identity by inspecting a digital signature and, if the signature is valid, exchange (or agree to exchange) a challenge, unique identifier, or another security token for encryption by the access-control element.

For example, the devices may utilize a challenge-and-response type handshake, where any trusted device knows a common secret (e.g., a common key, a set of keys, etc.) that can be used to generate a number of challenges and associated responses. In one configuration, devices may be permitted to trust an unknown device, provided that they can generate proper challenges, and/or appropriate responses. However, it will be appreciated that additional criteria may be applied before such trust is given.

In another example, the devices may use a unique identifier that is generated by the destination device with the access-control element request. The source device may include the unique identifier with the access-control element to identify the serviced request.

In other embodiments, the devices verify their peer device with a trusted third party (e.g., the trusted third party may provide each of the devices a session key). Such relationships may be verified directly or indirectly. For example, the peer devices may directly query a trusted third party before executing the transfer or, alternatively, each device may present a certificate signed by trusted third parties, etc.

Other types of cryptographic arrangements and trust techniques will be recognized by those of ordinary skill for use with the disclosure.

Moreover, the source device packages the access-control element with the secret (operation 306), e.g., challenge, unique identifier, or another security token. In an exemplary embodiment, the package is additionally encrypted using the destination device's public key. In some embodiments, prior to re-encrypting the access-control element, the source device decrypts the access-control element with its own private key.

After encryption with the destination device's public key, only the destination device can decrypt the access-control element for use. One example of a public-and-private-key encryption for transferring access-control elements is described in U.S. Provisional Patent Application Ser. No. 61/407,866, filed on Oct. 28, 2010, and entitled "Methods and Apparatus for Storage and Execution of Access-Control Elements," the contents of which are herein incorporated by reference. For example, each eUICC appliance may have a unique device public/private-key pair and endorsement certificate. The public/private-key pair may be based on a secret private key, and a publishable public key. Note that public/private-key techniques are considered 'asymmetric,' because the keys used to encrypt and decrypt are different; thus, the encrypter and decrypter do not share the same key.

It is further acknowledged that operations 306 and 304 (among others) of the method 300 may be further combined, subdivided, and/or reversed. For example, the source device may determine a session key and may encrypt the access-control element with the session key. The resulting package may be further wrapped with the destination device's public key. In some embodiments, the session key is determined by the destination device at the time of receipt.

Additionally, in some embodiments the packages are further digitally signed using a private cryptographic key (of a private/public signing pair) to provide further verification of the source device. The destination device may check the digital signature with the public cryptographic key to verify that the package (e.g., the access-control element and unique identifier, etc.) originated from the source device. Moreover, it should be understood that digital signatures are merely a subset of electronic signatures. Consequently, other forms of source verification may be similarly employed, including: user-specific identification (e.g., password, biometrics, challenge question/phrase, etc.), electronic identification (e.g., digital certificates, cryptography, etc.), etc.

Next, the packaged access-control element is transferred from the source to the destination device (operation 308). The destination device may verify the shared secret and, if the verification is successful, may store the encrypted access-control element for future use. In some embodiments, the access-control element is deleted, deactivated, or otherwise rendered unusable at the source device prior to enabling the access-control element for the destination device (e.g., prior to transfer, prior to completing transfer, prior to acknowledging transfer success, etc.).

In another embodiment, the security of download of the access-control elements is ensured by using the security protocol disclosed in co-owned, co-pending U.S. Provisional patent application Ser. No. 61/598,819, filed on Feb. 14, 2012, and entitled "Methods and Apparatus for Large Scale Distribution of Electronic Access Clients," the contents of which are herein incorporated by reference. As discussed therein, a tiered security-software protocol may be used. In an exemplary implementation, a server eUICC and client eUICC software may constitute a so-called 'stack' of software layers. Each software layer may be responsible for a set of hierarchical functions that are negotiated with its corresponding peer software layer.

Example Operation

As an example of typical operation according to the disclosure, during initialization the SIM vendors provide a collection or 'lot' of eSIMs to the eUICC appliances. Note that multiple SIM vendors may independently provide eSIMs. There may not be required collaboration on the part of the SIM vendors (although such collaboration may also be used if desired). The SIM vendors may encrypt each of the eSIMs with a challenge or unique identifier for the eUICC appliances.

As previously described, each eSIM may include a virtualized SIM and the unique key associations and capabilities to execute the aforementioned AKA technique for authenticating a portable electronic device to a cellular network. Additionally, each eSIM may be uniquely associated with a challenge or identifier that changes on a per-transfer basis. A typical implementation of a challenge or identifier may include: a cryptographic material, counter, pseudo-random sequence, large state machine, etc.

For example, a first eUICC appliance my initiate an eSIM transfer (which is currently encrypted for the first eUICC appliance) to a second eUICC appliance. The first eUICC appliance may initiate secure communication to the second eUICC appliance. In some embodiments, both the first and second eUICC appliances agree to the transfer based on certificates signed by one or more mutually trusted third parties. Moreover, the second eUICC appliance may provide a unique identifier to the first eUICC appliance. Then, the first eUICC appliance may decrypt the eSIM with its own private key, and then may re-encrypt the eSIM with the second eUICC's public key (this public key may be freely distributed by the second eUICC). The combination of the unique identifier and the re-encrypted eSIM may be signed by the first eUICC appliance (this signature may verify the first eUICC appliance's identity). Furthermore, the signed combination may be packaged for the second eUICC. Now, only the second eUICC can decrypt the eSIM, and the signed combination may prove that the encrypted eSIM package corresponds to the unique identifier. Additionally, the first eUICC appliance may transmit the newly encrypted eSIM to the second eUICC appliance.

In some embodiments, the unique identifier is used to protect against replay attacks. For example, each eSIM transfer may be uniquely identified so that the transaction cannot be 'copied' and played back (e.g., by a malicious third party). In particular, when transferring an eSIM between appliance A and appliance B, and then from appliance B to appliance C, the transfer between appliance A to appliance B cannot be replayed while the eSIM is still at appliance C.

Similarly, consider the transfer of an eSIM from the first eUICC appliance to a portable electronic device. The portable electronic device may issue a request for an eSIM with a challenge and its public key. The first eUICC appliance may decrypt an eSIM with its own private key, and may generate a proper challenge response. Then, the eSIM may be re-encrypted with the portable electronic device's public key. This re-encrypted eSIM may be combined with a challenge response, and then signed. Next, the portable electronic device may verify the challenge response (which may identify the first eUICC appliance as a legitimate source) and, if successful, may decrypt the eSIM for use. Even if a malicious third party could intercept the encrypted eSIM, it would not be able to use or tamper with the eSIM because the eSIM is encrypted.

Finally, consider the transfer of an eSIM from the first portable electronic device to the second portable electronic device. The first portable electronic device may push a request to transfer its eSIM to the second portable electronic device. In some embodiments, the user of either the first or second portable electronic device manually accepts the transfer. If accepted, the second portable electronic device may transmit a challenge to the first portable electronic device. Then, the first portable electronic device may decrypt its stored encrypted eSIM with its own private key, and may re-encrypt the eSIM with the second portable electronic device's public key (which may always be available), including the proper response. Next, the combination may be signed and transmitted. Moreover, the second portable electronic device may verify the challenge response (which may identify the first portable electronic device as a legitimate source), and may decrypt the eSIM for use.

Policy-Based Management of an Access-Control Element

Traditional access-control techniques usually enable a logical entity with proper credentials to perform various operations related to access-control elements. However, it may be desirable to provide more security for certain operations, such as loading an eSIM from a remote server. For example, a malicious logical entity may cause a virtual SIM to contain malicious code or may allow malicious data to be loaded. Alternatively, other operations (such as allowing a user to enable an eSIM that is already loaded into a eUICC) may involve fewer security risks and hence may not require cumbersome security measures, such as digital certificates. Instead, these operations may use simpler and less-restrictive security measures, such as PIN codes, or no special security at all as with the case of removing/inserting legacy UICC.

In addition, in existing eUICC designs a logical entity with proper credentials may be able to manage eSIM-related operations, such as loading an eSIM or enabling an eSIM.

However, to support different business models, it may be desirable for different logical entities to be able to manage different operations (i.e., different logical entities may have different privileges for the set operations of associated with an access-control element, such as an eSIM). Note that the different logical entities may include: users, security-service contractors hired by the mobile network operators, the mobile network operators, device manufacturers, and/or trusted OEM vendors. These logical entities may manage the different operations using hardware and/or software that are internal to the UE (such as a portable electronic device) and/or external to the UE.

A policy-based framework can be used to associate each eSIM-related operation with different logical entities (i.e., it may specify privileges of the logical entities), a different set of credentials and/or a different protocol that may be required to perform the operation. In the eUICC, there are a number of basic operations that are related to managing eSIMs, including: eSIM loading, eSIM enabling, eSIM disabling, eSIM deletion and eSIM exporting (which can be thought of as loading in the reverse direction, or alternatively could be between two eUICCs with a physical link). This policy-based framework may allow different logical entities (with their associated credentials) to perform different operations, and may also allow different security protocols to be associated with the different operations or the different logical entities. For example, to download secure data (such as an eSIM) from a remote location, the policy-based framework may provide strong security, which may involve requiring mutual authentication between the device and a remote server. On the other hand, it may be desirable to allow users to easily perform operations to swap eSIMs on a device without requiring strong security. For example, the policy-based framework may require the user to merely enter a PIN code before swapping eSIMs. Hence, in some embodiments operations related to exporting or loading eSIMs may be secure, while operations related to enabling or disabling eSIMs may be less secure.

Note that other information-retrieval operations or UICC-level operations may be supported by the policy-based framework. For example, the policy-based framework may support a security policy for updating the policy-based framework. This policy-based framework-updating operation may require even stronger authorization (for example, only the device manufacturer may be allowed to do this).

In some embodiments, the security framework is based on the public-key infrastructure (PKI). For example, if a remote server desires to perform an eSIM-related operation, the policy-based framework may require the remote server to be associated with a valid PKI digital certificate to be able to perform an eSIM-related operation. Alternatively, a simple user prompt with a PIN code may suffice for a local user. (Note that although PKI is advantageous, it may not be required, and other types of encryption, such as symmetric keys, may be used.)

Figure 4:
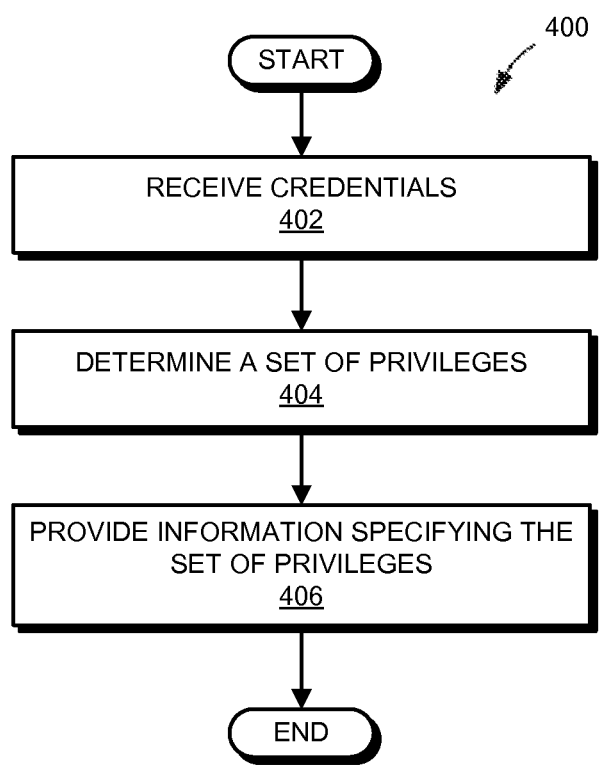
FIG. 4 is a flow diagram illustrating a method for specifying a set of privileges for logical entities for a set of operations associated with an access-control element in accordance with an embodiment of the present disclosure.

FIG. 4 presents a flow diagram illustrating a method 400 for specifying a set of privileges for logical entities for a set of operations associated with an access-control element (such as an eSIM), which may be performed by a processor in an electronic device (such as a processor in a secure element in the electronic device). During the method, credentials are received (operation 402) from a logical entity and a second logical entity. Note that the logical entity and the second logical entity may be internal and/or external to the electronic device. For example, the logical entity may be included in the electronic device and/or may access the electronic device remotely via a network.

Then, the set of privileges associated with the set of operations for the logical entity and the second logical entity are determined (operation 404) based on the credentials and the credential-management module. For example, the set of operations may include: loading the access-control element, enabling the access-control element, disabling the access-control element, exporting the access-control element, and/or deleting the access-control element. In particular, the set of operations may be associated with an access-control element in the secure element that identifies a user of a service and facilitates secure communication, and a given privilege in the set of privileges may specify whether the logical entity and/or the second logical entity are allowed to conduct or perform a given operation in the set of operations. Note that, for some of the operations, there are different privileges for the logical entity and the second logical entity. In some embodiments, a program module on the secure element is executed using the processor to provide the information.

Next, information specifying the set of privileges of the logical entity and the second logical entity are provided (operation 406) to operating system of the secure element. This allows the secure element to enforce the set of privileges. Thus, enforcement of privileges may be performed at the platform or operating-system level to determine which access-control-element operations can be allowed. In general, policies may be defined in either eUICC level (outside the access-control elements) or inside access-control elements, but enforcement of policies may be at the eUICC operating-system level (e.g., in the credential managing module).

Note that, based on the privilege setting, one or more logical entities (such as the logical entity and the second logical entity) can be configured as authorized to perform a given operation on an access-control element. Whether these logical entities do so at the same time or not depends on the use case. For example two different profiles may be loaded from two authorized servers at the same time. However, it may not be desirable for two different logical entities to enable/disable one or more access-control elements at the same time.

In addition to supporting different security domains on different computing platforms (where different machines have different security domains and different entities can be authorized in different security domains on different machines), as an alternate solution the policy-based framework may operate on a single computing platform. This policy-based framework may rely on a policy instead of domain separation to determine which logical entities are authorized to perform different operations.

As described further below with reference to FIGS. 6 and 7, the above-described policy-based framework may be implemented on any embedded UICC platform which operates inside a device, such as a UICC platform embedded in a cellular telephone or another computing platform. Moreover, the policy-based framework can be implemented on a secure element inside the device, such as an embedded UICC card which is soldered into the device.

In particular, the UICC card may have its own software that can run and enforce policies that specify privileges of the logical entities and a database of credentials (digital certificates, passwords and/or PIN codes), and may also provide storage for the eSIMs (and, more generally, the access-control elements). For example, as described further below with reference to FIGS. 6 and 7, the secure element on the UICC card may include a credential-management module that implements the policy-based framework. In addition, the credential-management module may include symmetric cryptographic keys associated with the set of operations, and a given cryptographic key may facilitate the privileges associated with at least a given operation in the set of operations. Alternatively or additionally, the credential-management module may include asymmetric cryptographic keys associated with the set of operations and certificates to facilitate asymmetric cryptography, and the given cryptographic key and a given certificate may facilitate the privileges associated with at least the given operation in the set of operations.

Moreover, the UICC card may interface with the device (such as a smartphone) via a standardized interface. During operation, the device may receive input via a GUI and may issue commands to the UICC card via this interface. Furthermore, remote servers may connect to the device first and then may set up a secure tunnel between the server and the embedded UICC through the device.

In some embodiments of methods 300 (FIG. 3) and 400 (FIG. 4), there may be additional or fewer operations. For example, the access-control element in method 400 may include information specifying a second set of privileges for at least one of the logical entity and the second logical entity. In the event of a conflict between a security level associated with the set of privileges and a second security level associated with the second set of privileges, the secure element may compare the security level and the second security level and may select the one of the set of privileges and the second set of privileges that is associated with stronger security. Alternatively, in the event of a conflict between a security level associated with the set of privileges and a second security level associated with the second set of privileges, the secure element may select the set of privileges. Moreover, as described further below with reference to FIGS. 6 and 7, if the privileges can, at least in part, be defined by the access-control element, in the event of a conflict or collision, conflict resolution may be performed. This conflict resolution may include selecting the more stringent security level associated with the different privileges determined by the credential-management module and the access-control element and/or defaulting to the privileges determined by the credential-management module. However, in some embodiments the secure element passes authority to the access-control element so that the privileges and/or security level specified by the access-control element are the default. Furthermore, the order of the operations may be changed, and/or two or more operations may be combined into a single operation.

In an exemplary embodiment, the credential-management module may determine authorization for a logical entity based on its credentials and one or more look-up tables. For example, the logical entity may provide a credential to the credential-management module. In response, the credential-management module may use one of the look-up tables to determine the privileges of the logical entity for a particular operation associated with at least one access-control element. This may allow the logical entity to perform at least the operation associated with at least the one access-control element (e.g., an eSIM), such as: loading the access-control element onto an electronic device, enabling the access-control element on the electronic device, disabling the access-control element on the electronic device, exporting the access-control element on the electronic device, and/or deleting the access-control element on the electronic device. In an exemplary embodiment, a UICC appliance may be allowed to load an access-control element and to export an access control element, an electronic device may be allowed to enable the access-control element, a network operator may be allowed to disable the access-control element, and the electronic device may be allowed to delete the access-control element.

The credential-management module may also allow different logical entities to have different privileges for different operations associated with different access-control elements based on credentials for the logical entities. Thus, one logical entity may be allowed to perform an operation associated with one access-control element, but may not be allowed to perform that operation (or another operation) associated with another access-control element. Similarly, another logical entity may have different privileges for these or other operations associated with these or other access-control elements.

Moreover, the type of credentials representing different logical entities may be different for different logical entities, different operations (associated with one or more access-control elements) and/or different access-control elements. For example, PKI/RSA authentication may be used for certain operations and/or access-control elements, while a PIN code may be used for other operations and/or access-control elements.

Furthermore, the privileges specified by the credential-management module may indicate that different security levels are used when presenting credentials/authenticating logical entities for different operations associated with one or more access-control elements and/or for different access-control elements. For example, symmetric cryptography may be used when presenting credentials authenticating a logical entity to determine privileges to perform a particular operation associated with an access-control element. However, a different security protocol may be specified for another operation associated with the access-control element (such as asymmetric cryptography).

Thus, the credential-management module may specify a policy that determines the privileges, credentials and/or security protocols/levels for different operations, different access-control elements and/or different logical entities. Note that the policy specified by the credential-management module may affect multiple access-control elements. However, in some embodiments an access-control element may specify a policy for itself, i.e., the policy may only affect the privileges for logical entities related to operations associated with that particular access-control element.

In embodiments in which there is a global policy in a secure element specified by the credential-management module and/or a local policy (which is sometimes referred to as a 'profile policy') for a particular access-control element specified by the access-control element, conflicts may occur. In the event of a conflict, for example, the global policy may: specify the use of RSA-based mutual authentication to load an eSIM; delegate the policy defaults to those of the profile policy when activating the eSIM; specify that the electronic device can deactivate the eSIM; specify the use of RSA-based mutual authentication to export an eSIM; and delegate the policy defaults to those of the profile policy when deleting the eSIM. In turn, the eSIM's profile policy may: have no entry for privileges related to loading the eSIM; specify the use of RSA-based mutual authentication with a specific L3 service common name to activate the eSIM; have no entry for privileges related to deactivating the eSIM; specify the use of RSA-based mutual authentication with a specific L3 service common name to export the eSIM; and specify the use of RSA-based mutual authentication with a specific L3 service common name to delete the eSIM. In general, the credential-management module may be the default in the event of a conflict between the global and the local policies. However, the credential-management module may delegate authority to specify the privileges to the profile policy (defined in eSIM) for particular operations.

Alternatively, the credential-management module may compare the global and the local privileges for a particular operation in the event of a conflict (or difference), and may use the more stringent security level. For example, if the global policy for loading an eSIM is to use RSA-based mutual authentication to activate the eSIM and the local policy is to use RSA-based mutual authentication with a specific L3 service common name to activate the eSIM, the credential-management module may use RSA-based mutual authentication with a specific L3 service common name.

Note that the credentials/privileges specified by the credential-management module may be remotely modified. For example, the credential-management module may include a look-up table with a first list of authorized logical entities, and a second list of logical entities that can modify the first list.

The communication between the logical entities and the secure element in the electronic device (and, in particular, with the credential-management module) in the preceding embodiments may use the communication techniques and the security protocols described previously in this disclosure.

Apparatuses

Various exemplary embodiments of an apparatus useful in conjunction with the above-described techniques are now described in greater detail.

Figure 5:
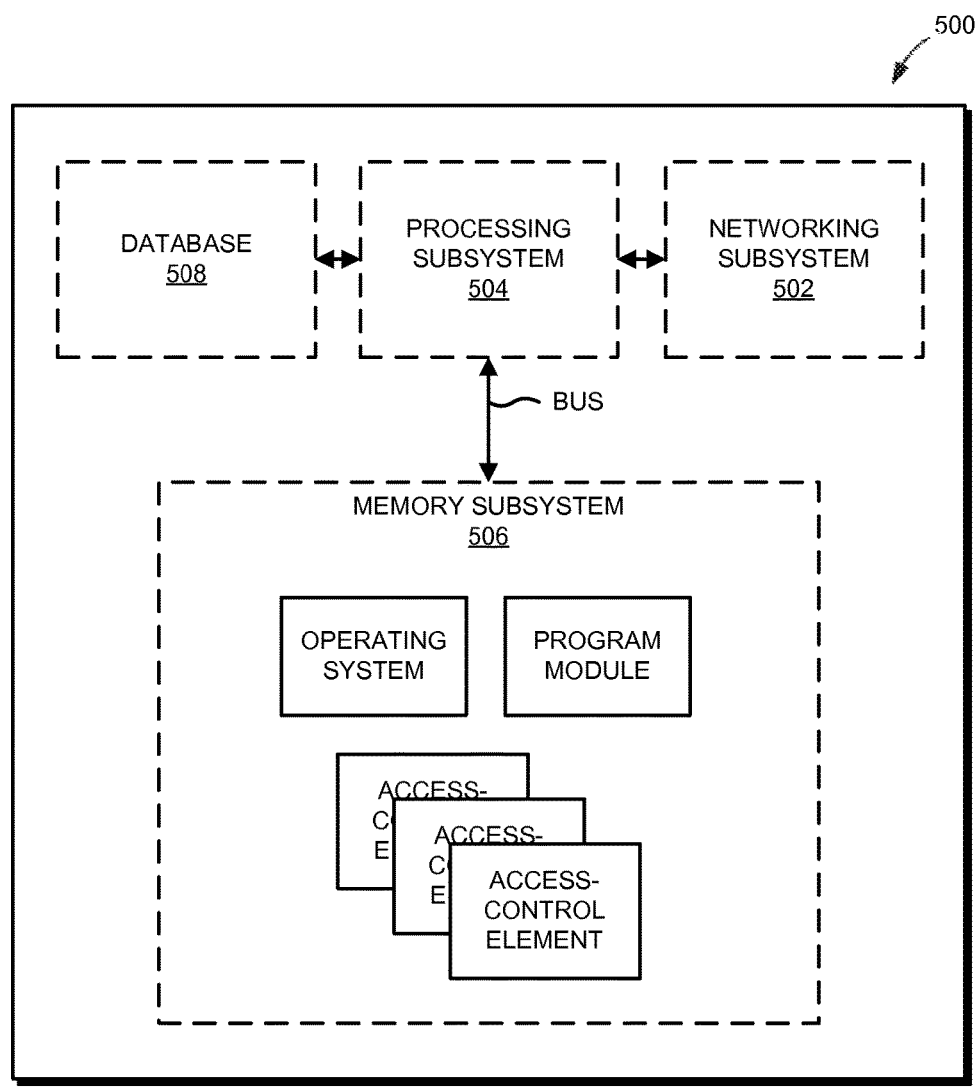
FIG. 5 is a block diagram illustrating an electronic Universal Integrated Circuit Card (eUICC) appliance adapted to store one or more access-control elements in accordance with an embodiment of the present disclosure.

FIG. 5 presents a block diagram illustrating a eUICC appliance 500. This eUICC appliance may be a stand-alone entity, or may be incorporated with other network entities (e.g., a SPS, etc.). As shown in FIG. 5, eUICC appliance 500 generally includes a networking subsystem 502 that interfaces with the communications network, a processing subsystem 504, and a memory subsystem 506. Processing subsystem 504 may include one or more devices configured to perform computational operations. For example, processing subsystem 504 can include one or more microprocessors, application-specific integrated circuits (ASICs), microcontrollers, programmable-logic devices, and/or one or more digital signal processors (DSPs).

Moreover, memory subsystem 506 may include one or more devices for storing data and/or instructions for processing subsystem 504 and/or networking interface 502. For example, memory subsystem 506 can include dynamic random access memory (DRAM), static random access memory (SRAM), and/or other types of memory. In some embodiments, instructions for processing subsystem 504 in memory subsystem 506 include: one or more program modules or sets of instructions, which may be executed by processing subsystem 504. Note that the one or more computer programs may constitute a computer-program mechanism. Moreover, instructions in the various modules in memory subsystem 506 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 504.

In addition, memory subsystem 506 can include mechanisms for controlling access to the memory. In some embodiments, memory subsystem 506 includes a memory hierarchy that comprises one or more caches coupled to a memory in eUICC appliance 500. In some of these embodiments, one or more of the caches is located in processing subsystem 504.

In some embodiments, memory subsystem 506 is coupled to one or more high-capacity mass-storage devices (not shown). For example, memory subsystem 506 can be coupled to a magnetic or optical drive, a solid-state drive, or another type of mass-storage device. In these embodiments, memory subsystem 506 can be used by eUICC appliance 500 as fast-access storage for often-used data, while the mass-storage device is used to store less frequently used data.

Networking subsystem 502 includes one or more devices configured to couple to and communicate on a wired and/or wireless network (i.e., to perform network operations), including an interface circuit (such as a near-field-communication circuit) and an antenna. For example, networking subsystem 502 can include a Bluetooth networking system, a cellular networking system (e.g., a 5G/4G network such as UMTS, LTE, etc.), a universal serial bus (USB) networking system, a networking system based on the standards described in IEEE 802.11 (e.g., a Wi-Fi networking system), an Ethernet networking system, and/or another communication system (such as a near-field-communication system).

Furthermore, networking subsystem 502 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the eUICC appliances or devices does not yet exist. Therefore, eUICC appliance 500 may use the mechanisms in networking subsystem 502 for performing simple wireless communication between eUICC appliances or devices. In some embodiments, networking subsystem 502 communicates with the MNO infrastructure so as to provide access to other eUICC appliances and/or direct or indirect access to one or more portable electronic devices, although other configurations and functionalities may be substituted.

In one configuration, eUICC appliance 500 is an HSM. An HSM may include one or more secure elements for managing a number of access-control elements. In some embodiments, the access-control elements are stored directly at the HSM. Alternatively, the access-control elements may be encrypted and stored in external storage. In such external (e.g., remote) storage embodiments, the encryption may ensure that the access-control elements are secure, even when stored on physically unsecure media.

The HSM may enable transfer of access-control elements to and from another HSM, while preserving the uniqueness and conservation of the access-control elements. Moreover, transfer of the access-control elements to another HSM in this embodiment may cause deactivation and/or deletion of the locally stored access-control elements. An HSM may also self-destruct or disable itself if tampered with or if its integrity is otherwise violated.

In FIG. 5, eUICC appliance 500 includes at least a database 508 running on the processing subsystem 504. Although illustrated as a single application running on eUICC appliance 500, it is appreciated that the foregoing database functionality may include a distributed application running on multiple devices in communication with one another.

An exemplary implementation of database 508 may process requests that may include: a request to store an access-control element (such as an eSIM), and a request to transfer a currently stored eSIM. Database 508 may also be responsible for verifying requests to ensure that communication is received from an entity authorized to make such a request (such as during operation 304 in method 300 in FIG. 3).

In some embodiments, database 508 is configured to execute a challenge-and-response (or challenge-response) security protocol. The challenge-response security protocol may verify requests made by an unknown third party based on appropriate generation of challenges and/or responses. Alternatively, the secure element may verify a digital certificate signed by a trusted authority.

As shown in FIG. 5, memory subsystem 506 may be adapted to store an array of access-control elements. In some embodiments, a eUICC appliance stores an array of access-control elements, such as eSIMs. Each eSIM may include a small file system that includes computer-readable instructions (such as the eSIM program) and associated data (e.g., cipher keys, integrity keys, etc.). In addition, each eSIM may be additionally encrypted with the eUICC appliance's public key. Consequently, each eUICC may only be decrypted by eUICC appliance 500. In some embodiments, each encrypted eSIM is further encrypted with a unique identifier, challenge, and/or challenge response. The encrypted components may be further stored as a binary large object (BLOB).

Database 508 application may manage the available eSIMs. As illustrated in FIG. 5, database 508 may provide information relating to the particular eSIM BLOB, the devices authorized to use the eSIM, the current state and/or the current status of the eSIM (e.g., 'available,' 'not available,' 'stale,' etc.). Additional information may be maintained as well. Moreover, database 508 application may update or change information stored in the database.

When another device requests an eSIM from eUICC appliance 500, database 508 application may retrieve the current state of the requested eSIM. This information may be used to determine if the requested eSIM can be provided. This validity check can be performed at an activation service, at eUICC appliance 500, be shared/distributed, or occur at yet other locations (e.g., by comparing the state at the activation service versus the last known state at eUICC appliance 500). Similarly, when another device transfers an eSIM to eUICC appliance 500, database 508 application may update the current state of the transferred eSIM.

Within eUICC appliance 500, processing subsystem 504, memory subsystem 506, networking subsystem 502, and database 508 may be coupled together using one or more interconnects, such as a bus. These interconnects may include an electrical, optical, and/or electro-optical connection that the subsystems or components can use to communicate commands and data among one another. Note that different embodiments can include a different number or configuration of electrical, optical, and/or electro-optical connections among the subsystems or components.

Although specific components are used to describe eUICC appliance 500, in alternative embodiments, different components and/or subsystems may be present in eUICC appliance 500. For example, eUICC appliance 500 may include one or more additional processing subsystems, memory subsystems, networking subsystems, and/or databases. Additionally, one or more of the subsystems or components may not be present in eUICC appliance 500. Moreover, in some embodiments, eUICC appliance 500 may include one or more additional subsystems or components that are not shown in FIG. 5. Also, although separate subsystems or components are shown in FIG. 5, in some embodiments some or all of a given subsystem or component can be integrated into one or more of the other subsystems or components in eUICC appliance 500.

Moreover, the circuits and components in eUICC appliance 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

Electronic Device

Figure 6:
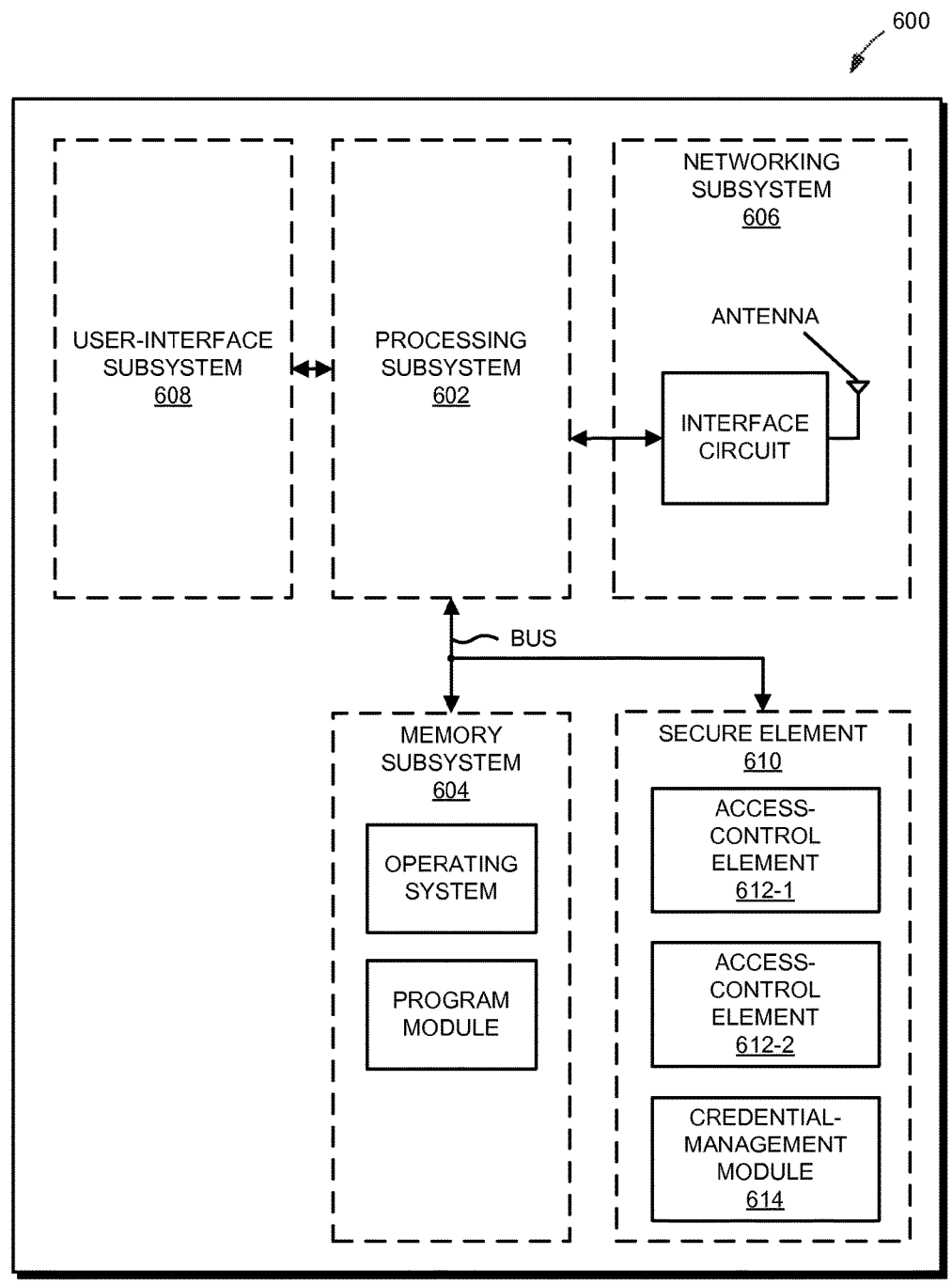
FIG. 6 is a block diagram illustrating an electronic device adapted to store and use one or more access-control elements in accordance with an embodiment of the present disclosure.

FIG. 6 presents a block diagram of electronic device 600 (e.g., a UE). This electronic device includes processing subsystem 602, memory subsystem 604, networking subsystem 606, user-interface subsystem 608, and secure element 610. Processing subsystem 602 includes one or more devices configured to perform computational operations. For example, processing subsystem 602 can include one or more microprocessors, application-specific integrated circuits (ASICs), microcontrollers, programmable-logic devices, field-programmable gate arrays and/or one or more digital signal processors (DSPs).

Moreover, memory subsystem 604 may include one or more devices for storing data and/or instructions for processing subsystem 602 and/or networking subsystem 606. For example, memory subsystem 604 can include dynamic random access memory (DRAM), static random access memory (SRAM), and/or other types of memory (such as flash or SDRAM). In some embodiments, instructions for processing subsystem 602 in memory subsystem 604 include: one or more program modules or sets of instructions, which may be executed by processing subsystem 602. Note that the one or more computer programs may constitute a computer-program mechanism. Moreover, instructions in the various modules in memory subsystem 604 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 602.

In addition, memory subsystem 604 can include mechanisms for controlling access to the memory. In some embodiments, memory subsystem 604 includes a memory hierarchy that comprises one or more caches coupled to a memory in electronic device 600. In some of these embodiments, one or more of the caches is located in processing subsystem 602.

In some embodiments, memory subsystem 604 is coupled to one or more high-capacity mass-storage devices (not shown). For example, memory subsystem 604 can be coupled to a magnetic or optical drive, a solid-state drive, or another type of mass-storage device. In these embodiments, memory subsystem 604 can be used by electronic device 600 as fast-access storage for often-used data, while the mass-storage device is used to store less frequently used data.

Networking subsystem 606 includes one or more devices configured to couple to and communicate on a wired and/or wireless network (i.e., to perform network operations), including an interface circuit (such as a near-field-communication circuit) and an antenna. For example, networking subsystem 606 can include a Bluetooth networking system, a cellular networking system (e.g., a 5G/4G network such as UMTS, GSM, CDMA, LTE/LTE-A, etc.), a universal serial bus (USB) networking system, a networking system based on the standards described in IEEE 802.11 (e.g., a Wi-Fi networking system), an Ethernet networking system, and/or another communication system (such as a near-field-communication system).

Furthermore, networking subsystem 606 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the eUICC appliance(s) and electronic device 600 does not yet exist. Therefore, electronic device 600 may use the mechanisms in the network interface for performing simple wireless communication between eUICC appliances or devices and electronic device 600.

User-interface subsystem 608 includes any number of well-known I/O devices including: a keypad, a touch screen (e.g., multi-touch interface), an LCD display, backlight, speaker, and/or microphone. However, it is recognized that in certain applications one or more of these components may be eliminated. For example, PCMCIA card-type client embodiments may lack a user interface (as they could piggyback onto the user interface of the host device to which they are physically and/or electrically coupled).

Secure element 610 may contain and operate the eUICC application. This secure element is capable of storing and accessing multiple access-control elements 612 to be used for authentication with a network operator. Secure element 610 includes in this embodiment a secure processor executing software stored in a secure media. The secure media may be inaccessible to all other components (other than the secure processor). Moreover, secure element 610 may be further hardened to prevent tampering (e.g., encased in resin), and may employ encryption for the protection of its contents, as previously described. While a eUICC is used as an illustration of secure element 610, other implementations may be used, including: an embedded secure element (on a circuit board in electronic device 600), a smart secure digital (SD) card, a smart microSD card, etc. Note that secure element 610 may include one or more applets or applications that execute in an environment of secure element 610 (such as in the operating system of secure element 610, and/or in a Java runtime environment executing on the secure element 610).

Moreover, secure element 610 may be capable of receiving and storing one or more access-control elements 612. In some embodiments, secure element 610 stores an array or plurality of eSIMs associated with a user (e.g., one for work, one for personal, several for roaming access, etc.), and/or according to another logical technique or relationship (e.g., one for each of multiple members of a family or business entity, one for each of personal and work use for the members of the family, and so forth). Each eSIM may include a small file system including computer-readable instructions (such as the eSIM program), and associated data (e.g., cipher keys, integrity keys, etc.)

Furthermore, secure element 610 may enable transfer of eSIMs to and/or from electronic device 600. In an exemplary embodiment, electronic device 600 provides a GUI-based acknowledgment to initiate transfer of an eSIM.

Various realizations of exemplary embodiments may include instructions that, when executed, launch a challenge-response security protocol. The challenge-response security protocol may verify requests made by an unknown third party based on appropriate generation of challenges and/or responses. Alternatively, in an exemplary embodiment, secure element 610 can verify a digital certificate signed by a trusted authority.

In some embodiments, secure element 610 maintains a listing or manifest of stored access-control elements 612. This manifest may include information as to the current status of the stored access-control elements 612. Moreover, the information may include: availability, completeness, validity, and/or prior experienced errors. The manifest may be further linked or coupled to user-interface subsystem 608 so as to enable user selection of an available access-control element.

In an exemplary embodiment, secure element 610 has associated device cryptographic keys. These device keys may be used to secure exchanges of access-control elements 612. In some embodiments, the cryptographic keys are an asymmetric public/private key pair. The public key can be freely distributed without compromising the integrity of the private keys. For example, the device may be assigned (or internally generate) an RSA public/private key. Note that the public key may be made available for post-deployment communication.

In some embodiments, secure element 610 includes credential-management module 614 that specifies a profile (corresponding to the policy-based framework) with a set of privileges for logical entities associated with operations in the set of operations that are associated with one or more of access-control elements 612. Furthermore, for some of the operations, there are different privileges for some of the logical entities. In some embodiments, credential-management module 614 includes information that is used by a program module in secure element 610 to specify the set of privileges.

Furthermore, at least one of access-control elements 612 may include information specifying a second set of privileges for at least one logical entity. In the event of a conflict between a security level associated with the set of privileges specified by credential-management module 614 and a second security level associated with the second set of privileges, secure element 610 may compare the security level and the second security level and may select the one of the set of privileges and the second set of privileges that is associated with stronger security. Alternatively, in the event of a conflict between a security level associated with the set of privileges and a second security level associated with the second set of privileges, secure element 610 may select the set of privileges.

In some embodiments, credential-management module 614 includes symmetric cryptographic keys associated with the set of operations, and a given cryptographic key facilitates the privileges associated with at least a given operation in the set of operations. Alternatively or additionally, credential-management module 614 may include asymmetric cryptographic keys associated with the set of operations and certificates to facilitate asymmetric cryptography, and the given cryptographic key and a given certificate may facilitate the privileges associated with at least the given operation in the set of operations.

Within electronic device 600, processing subsystem 602, memory subsystem 604, networking subsystem 606, user-interface subsystem 608 and secure element 610 may be coupled together using one or more interconnects, such as a bus. These interconnects may include an electrical, optical, and/or electro-optical connection that the subsystems or components can use to communicate commands and data among one another. Note that different embodiments can include a different number or configuration of electrical, optical, and/or electro-optical connections between the subsystems or components.

Electronic device 600 can be (or can be included in) any electronic device with at least one network interface. For example, electronic device 600 can be (or can be included in): a desktop computer, a laptop computer, a server, a media player (such as an MP5 player), an appliance, a subnotebook/netbook, a tablet computer, a smartphone, a cellular telephone, a piece of testing equipment, a 'smart meter,' a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, user interfaces and/or secure elements. Additionally, one or more of the subsystems or components may not be present in electronic device 600. Moreover, in some embodiments, electronic device 600 may include one or more additional subsystems or components that are not shown in FIG. 6. Also, although separate subsystems or components are shown in FIG. 6, in some embodiments some or all of a given subsystem or component can be integrated into one or more of the other subsystems or components in electronic device 600.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

Apparatus for Legacy Fixture Operation

Figure 7:
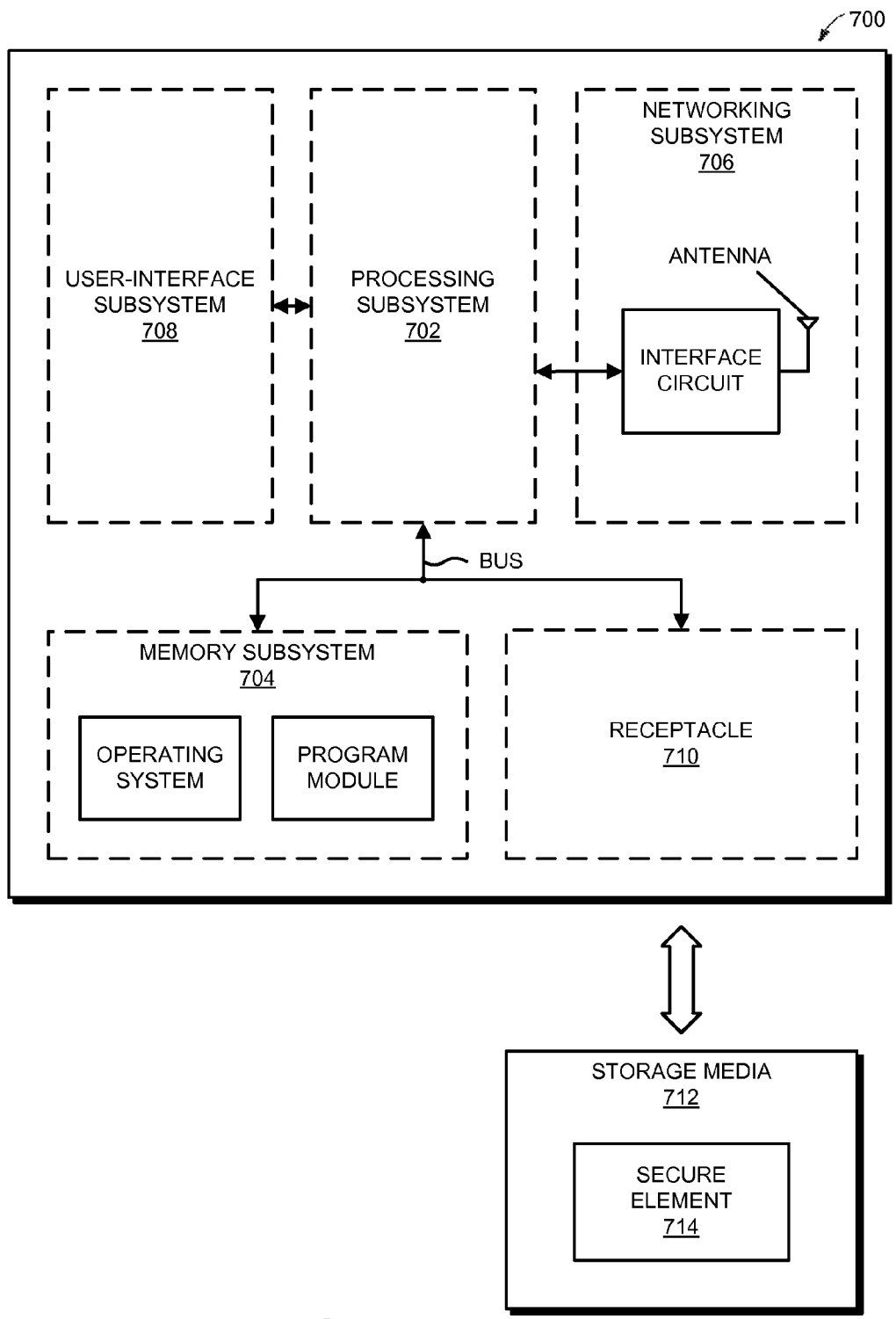
FIG. 7 is a block diagram illustrating an electronic device in accordance with an embodiment of the present disclosure.

FIG. 7 presents a block diagram of electronic device 700 (e.g., a UE). This electronic device includes processing subsystem 702, memory subsystem 704, networking subsystem 706, user-interface subsystem 708 and receptacle 710. Processing subsystem 702 includes one or more devices configured to perform computational operations. For example, processing subsystem 702 can include one or more microprocessors, application-specific integrated circuits (ASICs), microcontrollers, programmable-logic devices, field-programmable gate arrays and/or one or more digital signal processors (DSPs).

Moreover, memory subsystem 704 may include one or more devices for storing data and/or instructions for processing subsystem 702 and/or networking subsystem 706. For example, memory subsystem 704 can include dynamic random access memory (DRAM), static random access memory (SRAM), and/or other types of memory (such as flash or SDRAM). In some embodiments, instructions for processing subsystem 702 in memory subsystem 704 include: one or more program modules or sets of instructions, which may be executed by processing subsystem 702. Note that the one or more computer programs may constitute a computer-program mechanism. Moreover, instructions in the various modules in memory subsystem 704 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 702.

In addition, memory subsystem 704 can include mechanisms for controlling access to the memory. In some embodiments, memory subsystem 704 includes a memory hierarchy that comprises one or more caches coupled to a memory in electronic device 700. In some of these embodiments, one or more of the caches is located in processing subsystem 702. Note that access to memory in memory subsystem 704 may be facilitated via DMA hardware at memory subsystem 704.

In some embodiments, memory subsystem 704 is coupled to one or more high-capacity mass-storage devices (not shown). For example, memory subsystem 704 can be coupled to a magnetic or optical drive, a solid-state drive, or another type of mass-storage device. In these embodiments, memory subsystem 704 can be used by electronic device 700 as fast-access storage for often-used data, while the mass-storage device is used to store less frequently used data.

Networking subsystem 706 includes one or more devices configured to couple to and communicate on a wired and/or wireless network (i.e., to perform network operations), including an interface circuit (such as a near-field-communication circuit) and an antenna. For example, networking subsystem 706 can include a Bluetooth networking system, a cellular networking system (e.g., a 5G/4G network such as UMTS, GSM, CDMA, LTE/LTE-A, etc.), a universal serial bus (USB) networking system, a networking system based on the standards described in IEEE 802.11 (e.g., a Wi-Fi networking system), an Ethernet networking system, and/or another communication system (such as a near-field-communication system).

Furthermore, networking subsystem 706 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the eUICC appliance(s) and electronic device 700 does not yet exist. Therefore, electronic device 700 may use the mechanisms in the network interface for performing simple wireless communication between eUICC appliances or devices and electronic device 700.

User-interface subsystem 708 includes any number of well-known I/O devices including: a keypad, a touch screen (e.g., multi-touch interface), an LCD display, backlight, speaker, and/or microphone. However, it is recognized that in certain applications one or more of these components may be eliminated. For example, PCMCIA card-type client embodiments may lack a user interface (as they could piggyback onto the user interface of the host device to which they are physically and/or electrically coupled).

In contrast with the previously disclosed embodiments, electronic device 700 includes a receptacle 710 that receives storage media 712 which includes secure element 714 (which may be similar to or the same as secure element 610 in FIG. 6). In some embodiments, storage media 712 includes a SIM card form-factor device (although it will be appreciated that other types and configurations of card may be used consistent with the disclosure), and secure element 714 includes a eUICC application that executes on secure element 714. In the present context, a user device or apparatus having a physical SIM form factor (with secure element 714) removably inserted to the user device is referred to as a 'legacy' device.

Secure element 714 may be preconfigured to incorporate the eUICC onto the storage media 712 inserted into the electronic device 700. Alternatively, the eUICC may be downloaded to storage media 712 (subsequent to insertion into the electronic device 700) from a network. Such a download may require appropriate authentication and other mechanisms for ensuring security of the download (including use of the protocol disclosed in U.S. Provisional Patent Application Ser. No. 61/598,819, filed on Feb. 14, 2012, and entitled "Methods and Apparatus for Large Scale Distribution of Electronic Access Clients," the contents of which are herein incorporated by reference).

Moreover, secure element 714 may store and access multiple access-control elements 612 (FIG. 6) to be used for authentication with a network operator. Consequently, in some embodiments secure element 714 includes a secure processor executing software also stored in storage media 712.

Furthermore, secure element 714 may be further hardened to prevent tampering (e.g., encased in resin), and may employ encryption for the protection of its contents, as previously described. While a eUICC is used as an illustration of secure element 714, other implementations may be used, including: an embedded secure element (on a circuit board in electronic device 700), a smart secure digital (SD) card, a smart microSD card, etc. Note that secure element 714 may include one or more applets or applications that execute in an environment of secure element 714 (such as in the operating system of secure element 714, and/or in a Java runtime environment executing on the secure element 714).

The eUICC may be configured to recognize or otherwise determine the capabilities of a device (such as electronic device 700) into which it is placed via storage media 712. For example, storage media 712 may be physically configured to interact with one or more physical features of electronic device 700 in a particular manner based on the device capabilities level. This may include providing a particular number or array of electrical contacts on storage media 712. When storage media 712 is inserted into a first device having decreased capabilities, the interaction may not include connection to certain contacts. However, on insertion of storage media 712 into a device having increased capabilities, the interaction may be 'complete' in that all the contacts may be in communication with respective features of the device. In another example, a feature of storage media 712 may be compressed or remain deployed based on the insertion of storage media 712 into a user device based on the capabilities of the user device.

Alternatively, storage media 712 (and, therefore, secure element 714) may be made aware of the capabilities of the device into which it is inserted via signaling communications with the device.

In some embodiments, sensors present on storage media 712 may be used. Various additional mechanisms may be used to assist secure element 714 in determining the particular capabilities of the device into which it is inserted, the foregoing being merely exemplary of the overall concept.

Once a device capability is determined, various functions of secure element 714 may be used. For example, in a device having limited capabilities, the insertion of storage media 712 (which includes secure element 714) may merely cause the device to reboot according a default access-control element associate with secure element 714. In this case, secure element 714, although configured to store more than one access-control element, may be unable to execute a mechanism for switching between these, thereby mimicking the behavior of a legacy access-control element (e.g., a legacy SIM card). A default access-control element (preconfigured by the network) may always be automatically used. In some embodiments, the default access-control element is set to the last successfully enabled operational profile in backward-compatible operation mode upon reset.

Alternatively, if storage media 712 is inserted into a device having increased capabilities (e.g., a 'smart' device), secure element 714 may be triggered to enable a user of the device to access other functionalities associated with secure element 714. As noted above, secure element 714 may store an array of or multiple access-control elements 612 (e.g., eSIMs) in FIG. 6 associated with a user, and/or according to another logical technique or relationship (e.g., one for each of multiple members of a family or business entity, one for each of personal and work use for the members of the family, and so forth). Each eSIM may include a small file system including computer-readable instructions (such as the eSIM program), and associated data (e.g., cipher keys, integrity keys, etc.). When storage media 712 is inserted into the 'smart' device, a new interface may be opened on a display associated with the device, enabling the user to select from multiple available access-control elements 612 (FIG. 6). In addition, each access-control element may provide different capabilities or functions not available to other access-control elements.

For example, as disclosed in U.S. patent application Ser. No. 13/080,521, filed on Apr. 5, 2011, and entitled "Methods and Apparatus for Storage and Execution of Access Control Clients" (the contents of which are herein incorporated by reference), a device may activate and execute one of multiple stored access-control elements 612 (e.g., eSIMs) in FIG. 6, such that, when loading an eSIM, the operating system may only need to load the list of software necessary for the current run-time environment. This 'sandboxing' effect may ensure that multiple eSIMs can be used within the same device without inappropriate access to other eSIMs.

Switching among multiple eSIMs may also be provided according to the exemplary methods and apparatus discussed in U.S. patent application Ser. No. 13/079,614, filed on Apr. 4, 2011, and entitled "Management Systems for Multiple Access Control Entities," the contents of which are herein incorporated by reference.

It is further appreciated that for each enabled eSIM, the eUICC may support logical channels to enable communication between each eSIM and the appropriate applications running on the eSIM. In some embodiments, each eUICC eSIM is assigned its own individual logical channel. In some embodiments, the logical channel is dedicated to only that eSIM, and this logical channel can carry nothing else. In other words, the eUICC may ensure that at most one eSIM may be selected on a logical channel. Note that multiple applications may be run for each eSIM on the eUICC.

In some embodiments, secure element 714 enables transfer of access-control elements to and/or from electronic device 700. In an exemplary embodiment, electronic device 700 provides a GUI-based acknowledgment to initiate transfer of an eSIM. It is further appreciated that to enable such transfer functionality, an HSM either at storage media 712 or at electronic device 700 may be used. As noted previously, the HSM may encrypt information (such as eSIM and eSIM-related information) and may store it prior to transmission to another entity. The stored information may also be wrapped with an encrypted key by the HSM for further transmission security.

Additionally, the user device and any trusted third-party entity may mutually verify one another to further ensure security of a transfer (such as a transfer of access-control elements 612 (FIG. 6) between user devices or between a user device and the network, or a transfer of a eUICC to the legacy device).

In some embodiments, a third-party entity is issued credentials for trusted operation, even after the user equipment has been deployed. For example, an electronic device (e.g., UMTS UE) can identify a third-party eSIM (e.g., a virtual or an eSIM) vendor, and initiate a trusted dialog to purchase, acquire, or update its eSIM. Similarly, the third-party eSIM vendor can verify that the UE is a trusted device, and may securely encode its eSIM for delivery. The trusted dialog may be based on a unique device key and endorsement certificate. In an exemplary embodiment, the device key is based on a public/private key cryptography.

Moreover, unlike existing solutions, this feature of the disclosure may enable delivery of access-control element material to a legacy device without a pre-existing access-control element, thereby greatly enhancing user flexibility and user experience.

In some embodiments, secure element 714 includes a credential-management module (which may be similar to or the same as credential-management module 614 in FIG. 6). This credential-management module may specify a profile (corresponding to the policy-based framework) with a set of privileges for logical entities associated with operations in the set of operations that are associated with one or more of access-control elements 612 (FIG. 6). Furthermore, for some of the operations, there are different privileges for some of the logical entities. In some embodiments, credential-management module 614 (FIG. 6) includes information that is used by a program module in secure element 714 to specify the set of privileges.

Furthermore, at least one of access-control elements 612 (FIG. 6) may include information specifying a second set of privileges for at least one logical entity. In the event of a conflict between a security level associated with the set of privileges specified by credential-management module 614 (FIG. 6) and a second security level associated with the second set of privileges, secure element 714 may compare the security level and the second security level and may select the one of the set of privileges and the second set of privileges that is associated with stronger security. Alternatively, in the event of a conflict between a security level associated with the set of privileges and a second security level associated with the second set of privileges, secure element 714 may select the set of privileges.

In some embodiments, credential-management module 614 (FIG. 6) includes symmetric cryptographic keys associated with the set of operations, and a given cryptographic key facilitates the privileges associated with at least a given operation in the set of operations. Alternatively or additionally, credential-management module 614 (FIG. 6) may include asymmetric cryptographic keys associated with the set of operations and certificates to facilitate asymmetric cryptography, and the given cryptographic key and a given certificate may facilitate the privileges associated with at least the given operation in the set of operations.

Within electronic device 700, processing subsystem 702, memory subsystem 704, networking subsystem 706, user-interface subsystem 708 and receptacle 710 may be coupled together using one or more interconnects, such as a bus. These interconnects may include an electrical, optical, and/or electro-optical connection that the subsystems or components can use to communicate commands and data among one another. Note that different embodiments can include a different number or configuration of electrical, optical, and/or electro-optical connections between the subsystems or components.

Electronic device 700 can be (or can be included in) any electronic device with at least one network interface. For example, electronic device 700 can be (or can be included in): a desktop computer, a laptop computer, a server, a media player (such as an MP5 player), an appliance, a subnotebook/netbook, a tablet computer, a smartphone, a cellular telephone, a piece of testing equipment, a 'smart meter,' a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, user interfaces and/or receptacles. Additionally, one or more of the subsystems or components may not be present in electronic device 700. Moreover, in some embodiments, electronic device 700 may include one or more additional subsystems or components that are not shown in FIG. 7. Also, although separate subsystems or components are shown in FIG. 7, in some embodiments some or all of a given subsystem or component can be integrated into one or more of the other subsystems or components in electronic device 700.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access control client provisioning server, comprising:
 a secure memory configured to store a plurality of access control clients; and
 a processor configured to cause the access control client provisioning server to carry out steps that include:
  receiving a request from a mobile wireless device to transfer a particular access control client of the plurality of access control clients to the mobile wireless device,
  identifying a first security policy implemented by the mobile wireless device,
  determining that the first security policy aligns with a second security policy implemented by the access control client provisioning server,
  preparing the particular access control client to be transferred to the mobile wireless device, and
  transferring the particular access control client to the mobile wireless device.

2. The access control client provisioning server of claim 1, wherein the second security policy indicates requirements associated with transferring access control clients to destination mobile wireless devices, and the first security policy satisfies the requirements indicated by the second security policy.

3. The access control client provisioning server of claim 1, wherein preparing the particular access control client to be transferred to the mobile wireless device comprises:
 obtaining a public key associated with the mobile wireless device,
 generating a challenge for the mobile wireless device, and
 encrypting the particular access control client and the challenge using the public key.

4. The access control client provisioning server of claim 3, wherein the steps further include, subsequent to transferring the particular access control client to the mobile wireless device:
 receiving a response to the challenge from the mobile wireless device;
 when the response indicates that the challenge is satisfied:
  removing the particular access control client from the plurality of access control clients; and
 when the response indicates that the challenge is not satisfied:
  retaining the particular access control client within the plurality of access control clients.

5. The access control client provisioning server of claim 1, wherein the access control client provisioning server is included in a group of access control client provisioning servers configured to communicate with one another, and the particular access control client is stored on at least one different access control client provisioning server included in the group of access control client provisioning servers.

6. The access control client provisioning server of claim 5, wherein the steps further include:
 indicating to the at least one different access control client provisioning server that the particular access control client is being transferred to the mobile wireless device.

7. The access control client provisioning server of claim 1, wherein each access control client of the plurality of access control clients is an electronic Subscriber Identity Module (eSIM).

8. A method for securing a transfer of an access control client between a first device and a second device, the method comprising:
 at the first device that stores the access control client:
  identifying a condition in which to transmit the access control client to the second device;
  identifying at least one security policy implemented by the second device; and
  when the at least one security policy satisfies one or more security policies implemented by the first device:
   preparing the access control client to be transferred to the second device, and
   transferring the access control client to the second device.

9. The method of claim 8, wherein the first device is a first mobile wireless device and the second device is a second mobile wireless device.

10. The method of claim 8, wherein the first device is an access control client provisioning server and the second device is a mobile wireless device.

11. The method of claim 8, wherein the access control client is encrypted using a first public key associated with the first device.

12. The method of claim 11, wherein preparing the access control client to be transferred to the second device comprises:
 decrypting the access control client using a private key associated with the first public key;
 identifying a second public key associated with the second device, and
 encrypting the access control client using the second public key.

13. The method of claim 8, wherein the access control client is an electronic Subscriber Identity Module (eSIM).

14. The method of claim 8, further comprising, subsequent to transferring the access control client to the second device:
 deactivating the access control client at the first device.

15. A non-transitory computer readable storage medium configured to store instructions that, when executed by a processor included in an access control client provisioning server, cause the access control client provisioning server to carry out steps that include:
 receiving a request from a device to transfer a particular access control client of a plurality of access control clients to the device, wherein the plurality of access control clients are managed by the access control client provisioning server;
 identifying a first security policy implemented by the device;
 determining that the first security policy aligns with a second security policy implemented by the access control client provisioning server;
 preparing the particular access control client to be transferred to the device; and
 transferring the particular access control client to the device.

16. The non-transitory computer readable storage medium of claim 15, wherein the second security policy indicates requirements associated with transferring access control clients to destination devices, and the first security policy satisfies the requirements indicated by the second security policy.

17. The non-transitory computer readable storage medium of claim 15, wherein preparing the particular access control client to be transferred to the device comprises:
 obtaining a public key associated with the device,
 generating a challenge for the device, and
 encrypting the particular access control client and the challenge using the public key.

18. The non-transitory computer readable storage medium of claim 17, wherein the steps further include, subsequent to transferring the particular access control client to the device:
  receiving a response to the challenge from the device;
  when the response indicates that the challenge is satisfied:
    removing the particular access control client from the plurality of access control clients; and
  when the response indicates that the challenge is not satisfied:
    retaining the particular access control client within the plurality of access control clients.

19. The non-transitory computer readable storage medium of claim 15, wherein the access control client provisioning server is included in a group of access control client provisioning servers configured to communicate with one another, and the particular access control client is stored on at least one different access control client provisioning server included in the group of access control client provisioning servers.

20. The non-transitory computer readable storage medium of claim 19, wherein the steps further include:
  indicating to the at least one different access control client provisioning server that the particular access control client is being transferred to the device.

* * * * *